: US 12,167,406 B2
Gao et al. (45) Date of Patent: Dec. 10, 2024

(54) UPLINK CONTROL INFORMATION UCI TRANSMISSION METHOD AND APPARATUS

(71) Applicant: DATANG MOBILE COMMUNICATIONS EQUIPMENT CO., LTD., Beijing (CN)

(72) Inventors: Xuejuan Gao, Beijing (CN); Qianqian Si, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/261,845

(22) PCT Filed: Jan. 14, 2022

(86) PCT No.: PCT/CN2022/072145
§ 371 (c)(1),
(2) Date: Jul. 18, 2023

(87) PCT Pub. No.: WO2022/152272
PCT Pub. Date: Jul. 21, 2022

(65) Prior Publication Data
US 2024/0040571 A1 Feb. 1, 2024

(30) Foreign Application Priority Data
Jan. 18, 2021 (CN) .......................... 202110065345.5

(51) Int. Cl.
*H04W 72/21* (2023.01)
*H04L 1/00* (2006.01)
*H04L 1/1812* (2023.01)

(52) U.S. Cl.
CPC ........... *H04W 72/21* (2023.01); *H04L 1/0008* (2013.01); *H04L 1/1812* (2013.01)

(58) Field of Classification Search
CPC ................. H04W 72/21; H04W 28/06; H04W 72/1268; H04W 72/54; H04W 72/0446;
(Continued)

(56) References Cited

U.S. PATENT DOCUMENTS 11,381,346 B2 * 7/2022 Islam .................... H04L 1/1861
11,706,776 B2 * 7/2023 Papasakellariou .... H04L 5/0053
370/329
11,751,208 B2 * 9/2023 Rastegardoost ...... H04W 72/23
370/329
(Continued)

FOREIGN PATENT DOCUMENTS

CN 102347825 A 2/2012
CN 103516489 A 1/2014
(Continued)

OTHER PUBLICATIONS

ISA State Intellectual Property Office of the People's Republic of China, International Search Report Issued in Application No. PCT/CN2022/072145, Apr. 2, 2022, WIPO, 9 pages.
(Continued)

*Primary Examiner* — Brian T O Connor
(74) *Attorney, Agent, or Firm* — Kilpatrick Townsend & Stockton LLP

(57) ABSTRACT

The present application provides a UCI transmission method and apparatus, which can support multiplexing transmission of UCI with different priorities on a same uplink channel. The method includes: determining whether a bit number of a UCI sequence exceeds a first preset threshold; when determining that the bit number of the UCI sequence does not exceed the first preset threshold, encoding the UCI sequence in a first-type encoding scheme, or, adding a padding bit or an occupancy bit to the UCI sequence till satisfying that a total number of bits exceeds the first preset threshold, obtaining a padded UCI sequence, encoding the padded UCI sequence in a second-type encoding scheme;
(Continued)

and transmitting an encoded first UCI sequence and an encoded second UCI sequence on a same uplink channel.

20 Claims, 5 Drawing Sheets

(58) Field of Classification Search
CPC .... H04W 72/20; H04L 1/0008; H04L 1/0061; H04L 1/0067; H04L 1/1812; H04L 5/0055; H04L 5/0057; H04L 5/0078; H04L 1/0027; H04L 1/0031; H04L 1/1671; H04L 1/1854; H04L 1/0026; H04L 5/0048; H04L 5/0053; H04L 1/1607

See application file for complete search history.

(56) References Cited

U.S. PATENT DOCUMENTS

| | | | |
|---|---|---|---|
| 11,870,587 B2* | 1/2024 | Yang | H04L 1/1861 |
| 12,016,016 B2* | 6/2024 | Yi | H04W 72/1268 |
| 2015/0043452 A1* | 2/2015 | Li | H04L 1/1896 370/329 |
| 2015/0173066 A1* | 6/2015 | Gao | H04L 1/06 370/329 |
| 2020/0344032 A1* | 10/2020 | Yang | H04L 5/0053 |
| 2021/0022129 A1* | 1/2021 | Yuan | H04L 5/0057 |
| 2022/0321276 A1* | 10/2022 | Islam | H04W 72/21 |
| 2023/0035066 A1* | 2/2023 | Bae | H04W 72/1268 |
| 2023/0318748 A1* | 10/2023 | Yin | H04L 1/1854 370/329 |
| 2023/0422242 A1* | 12/2023 | Guo | H04L 1/1812 |
| 2024/0008035 A1* | 1/2024 | Dai | H04L 1/1812 |

FOREIGN PATENT DOCUMENTS

| | | |
|---|---|---|
| CN | 109802819 A | 5/2019 |
| CN | 111742592 A | 10/2020 |
| JP | 2015529053 A | 10/2015 |
| JP | 2020526085 A | 8/2020 |
| WO | 2016161801 A1 | 10/2016 |
| WO | 2017028606 A1 | 2/2017 |
| WO | 2019130522 A1 | 7/2019 |

OTHER PUBLICATIONS

ETRI,"Remaining issues for UCI repetition", 3GPP TSG RAN WG1 Meeting 92bis, Sanya, China, April 16-Apr. 20, 2018, total 4 pages, R1-1804493.

European Patent Office, Extended European Search Report Issued in Application No. 22739147.1, Apr. 24, 2024, Germany, 13 pages.

Japanese Patent Office, Office Action Issued in Application No. 2023-538815, Jun. 10, 2024, 17 pages.

CATT, "On short PUCCH formats supporting up to two UCI bits", 3GPP TSG RAN WG1 Meeting NR#3, Nagoya, Japan, Sep. 18-21, 2017, total 4 pages, R1-1715817.

Panasonic, "Discussion on Intra-UE multiplexing and prioritization of different priority", 3GPP TSG RAN WG1 #103-e, e-Meeting, Oct. 26-Nov. 13, 2020, total 7 pages, R1-2008955.

Huawei et al., "Remaining issues for physical uplink control channel", 3GPP TSG RAN WG1 Meeting #94bis, Chengdu, China, Oct. 8-12, 2018, total 19 pages, R1-1810110.

Ericsson, "Maintenance Issues on UCI Multiplexing on PUCCH", 3GPP TSG RAN WG1 #95, Spokane, USA, Nov. 12-16, 2018, total 13 pages, R1-1813949.

* cited by examiner

UPLINK CONTROL INFORMATION UCI TRANSMISSION METHOD AND APPARATUS

CROSS-REFERENCE TO RELATED APPLICATION

This application is national stage of International Application No. PCT/CN2022/072145, filed on Jan. 14, 2022, which claims priority to Chinese Patent Application No. 202110065345.5, filed to the China National Intellectual Property Administration on Jan. 18, 2021 and entitled "Uplink Control Information UCI Transmission Method and Apparatus". Both of the aforementioned applications are hereby incorporated by reference in their entireties.

FIELD

The present application relates to the field of communication technology and, in particular, to an uplink control information (UCI) transmission method and apparatus.

BACKGROUND

Currently, the fifth generation new radio access technology (5G NR) does not support, on a carrier for transmitting a physical uplink control channel (PUCCH), the existence of multiplexing transmission of multiple pieces of uplink control information with different priorities on the same PUCCH.

For avoiding that UCI with different priorities might conflict with each other during transmission, a high-priority PUCCH could be selected for transmission while a low-priority PUCCH could be discarded, when a resource conflict occurs.

However, the aforementioned method does not allow concurrent transmission of some UCI with different priorities, and will have an impact on transmission of a low-priority service.

SUMMARY

The present application provides an uplink control information (UCI) transmission method and apparatus, which can support multiplexing transmission of UCI with different priorities on a same uplink channel.

In a first aspect, provided is a UCI transmission method, including: determining, by a terminal device, whether a bit number of a UCI sequence exceeds a first preset threshold, where the UCI sequence includes first UCI and second UCI, and a first uplink channel carrying the first UCI and a second uplink channel carrying the second UCI overlap in a time domain or a transmission time interval between the first uplink channel carrying the first UCI and the second uplink channel carrying the second UCI is less than a second preset threshold; when determining that the bit number of the UCI sequence does not exceed the first preset threshold, encoding the UCI sequence in a first-type encoding scheme, or, adding a padding bit or an occupancy bit to the UCI sequence till satisfying that a total number of bits exceeds the first preset threshold, obtaining a padded UCI sequence, and encoding the padded UCI sequence in a second-type encoding scheme; and transmitting an encoded first UCI sequence and an encoded second UCI sequence on a same uplink channel.

According to embodiments of the present application, different encoding schemes can be determined according to the bit numbers of different UCI sequences to achieve the objective of transmitting some different UCI on the same uplink channel.

In conjunction with the first aspect, in some implementations of the first aspect, the following is further included: cascading, by the terminal device, the first UCI and the second UCI to obtain a first cascaded UCI sequence; when determining that a total number of bits of the first cascaded UCI sequence does not exceed the first preset threshold, encoding the first cascaded UCI sequence in the first-type encoding scheme, or, adding a padding bit or an occupancy bit to the first cascaded UCI sequence till satisfying that the total number of bits of the first cascaded UCI sequence exceeds the first preset threshold, obtaining a padded first cascaded UCI sequence, and encoding the padded first cascaded UCI sequence in the second-type encoding scheme.

In conjunction with the first aspect, in some implementations of the first aspect, the first UCI is $A_1$-bit HARQ-ACK and the second UCI is $A_2$-bit HARQ-ACK, where $A_1$ is equal or unequal to $A_2$, and $A_1+A_2$ does not exceed the first preset threshold; or the first UCI is $A_3$-bit HARQ-ACK, and the second UCI is an SR, and $A_3$ does not exceed the first preset threshold.

In conjunction with the first aspect, in some implementations of the first aspect, when the first UCI is $A_1$-bit HARQ-ACK and the second UCI is $A_2$-bit HARQ-ACK, the method further includes:

if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, adopting one of the following methods:

Method 1: determining that the SR has a bit number of X bits, cascading the X-bit SR with the first UCI and the second UCI to obtain a second cascaded UCI sequence, and encoding the second cascaded UCI sequence in the second-type encoding scheme;

Method 2: determining that the SR has a bit number of X bits, cascading the X-bit SR with the first UCI and the second UCI to obtain a second cascaded UCI sequence, and when determining that a total number of bits of the second cascaded UCI sequence does not exceed the first preset threshold, encoding the second cascaded UCI sequence in the first-type encoding scheme, or, adding a padding bit or an occupancy bit to the second cascaded UCI sequence till satisfying that a total number of bits of the second cascaded UCI sequence exceeds the first preset threshold, obtaining a padded second cascaded UCI sequence, and encoding the padded second cascaded UCI sequence in the second-type encoding scheme; and when determining that the total number of bits of the second cascaded UCI sequence exceeds the first preset threshold, encoding the second cascaded UCI sequence in the second-type encoding scheme;

where $X=\text{ceil}(\log2(K+1))$, ceil( ) is rounding up, and K is a configured number of SRs or a number of SRs meeting the following condition: the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold.

In conjunction with the first aspect, in some implementations of the first aspect, when the first UCI is $A_3$-bit HARQ-ACK and the second UCI is an SR, the method includes:

Method 1: determining that the SR has a bit number of X bits, cascading the X-bit SR with the first UCI to obtain a third cascaded UCI sequence, and encoding the third cascaded UCI sequence in the second-type encoding scheme; or Method 2: determining that the SR has a bit number of X bits, cascading the X-bit SR with the first UCI to obtain a third cascaded UCI sequence, and when determining that a total number of bits of the third cascaded UCI sequence does not exceed the first preset threshold, encoding the third cascaded UCI sequence in the first-type encoding scheme, or, adding a padding bit or an occupancy bit to the third cascaded UCI sequence till satisfying that a total number of bits of the third cascaded UCI sequence exceeds the first preset threshold, obtaining a padded third cascaded UCI sequence, and encoding the padded third cascaded UCI sequence in the second-type encoding scheme; and when determining that the total number of bits of the third cascaded UCI sequence exceeds a predetermined threshold, encoding the third cascaded UCI sequence in the second-type encoding scheme;

where X=ceil(log2(K+1)), ceil( ) is rounding up, and K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In conjunction with the first aspect, in some implementations of the first aspect, the method further includes: determining, by the terminal device, whether a bit number of the first UCI and a bit number of the second UCI respectively exceeds the first preset threshold; when determining that the bit number of the first UCI does not exceed the first preset threshold, encoding the first UCI in the first-type encoding scheme, or, adding a padding bit or an occupancy bit to the first UCI till satisfying that the bit number of the first UCI exceeds the first preset threshold, obtaining a padded first UCI sequence, and encoding the padded first UCI sequence in the second-type encoding scheme; and/or, when determining that the bit number of the second UCI does not exceed the first preset threshold, encoding the second UCI in the first-type encoding scheme, or, adding a padding bit or an occupancy bit to the second UCI till satisfying that the bit number of the second UCI exceeds the first preset threshold, obtaining a padded second UCI sequence, and encoding the padded second UCI sequence in the second-type encoding scheme.

In conjunction with the first aspect, in some implementations of the first aspect, the first UCI is $A_4$-bit HARQ-ACK and the second UCI is $A_5$-bit HARQ-ACK, where $A_4$ is equal or unequal to $A_5$, and at least one of $A_4$ and $A_5$ does not exceed the first preset threshold; or the first UCI is $A_6$-bit HARQ-ACK and the second UCI is an SR, where at least one of a bit number of the SR and $A_6$ does not exceed the first preset threshold, the bit number of the SR is X=ceil (log2(K+1)), ceil( ) is rounding up, K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In conjunction with the first aspect, in some implementations of the first aspect, when the first UCI is $A_4$-bit HARQ-ACK and the second UCI is $A_5$-bit HARQ-ACK, if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, the method further includes:

determining that the SR has a bit number of X bits, and cascading the X-bit SR with first target UCI to obtain a fourth cascaded UCI sequence, where the first target UCI is one of the first UCI and the second UCI; encoding respectively, in the first-type decoding scheme, each individual sequence within the fourth cascaded UCI sequence and second target UCI for which a bit number does not exceed the first preset threshold, or, adding respectively a padding bit or an occupancy bit to each individual sequence till satisfying that a total number of bits exceeds the first preset threshold, and encoding, in the second-type encoding scheme, the sequence to which the padding bit or the occupancy bit is added; and encoding, in the second-type encoding scheme, each individual sequence within the fourth cascaded UCI sequence and the second target UCI for which a bit number exceeds the first preset threshold; where the second target UCI is UCI other than the first target UCI of the first UCI and the second UCI.

In conjunction with the first aspect, in some implementations of the first aspect, the transmitting the encoded first UCI sequence and the encoded second UCI sequence on the same uplink channel includes: when a padding bit or an occupancy bit is added, determining, according to a bit number of a sequence to which the padding bit or the occupancy bit is added, a PUCCH resource carrying the encoded first UCI sequence and the encoded second UCI sequence.

In conjunction with the first aspect, in some implementations of the first aspect, the first-type encoding scheme is repetition encoding or RM encoding, and the second-type encoding scheme is RM encoding, Polar encoding, LDPC encoding, TBCC encoding or Turbo encoding.

In conjunction with the first aspect, in some implementations of the first aspect, the first UCI and the second UCI is UCI of a same physical layer priority or different physical layer priorities; or the first UCI and the second UCI is respectively one piece of UCI between UCI corresponding to a unicast service and UCI corresponding to a multicast service.

In a second aspect, provided is a UCI transmission method, including: receiving, by a network device, an encoded first UCI sequence and an encoded second UCI sequence on a same uplink channel;

determining whether a bit number of a UCI sequence exceeds a first preset threshold, where the UCI sequence includes first UCI and second UCI, and a first uplink channel carrying the first UCI and a second uplink channel carrying the second UCI overlap in a time domain or a transmission time interval between the first uplink channel carrying the first UCI and the second uplink channel carrying the second UCI is less than a second preset threshold;

when determining that the bit number of the UCI sequence does not exceed the first preset threshold, decoding the UCI sequence in a first-type decoding scheme, or, determining that a padding bit or an occupancy bit is added to the UCI sequence by a terminal device till satisfying that a total number of bits exceeds the first preset threshold, and decoding, in a second-type decoding scheme, the sequence to which the padding bit or the occupancy bit is added.

In embodiments of the present application, after the network device receives an encoded UCI sequence, a decoding scheme corresponding to the encoding scheme is used to decode the encoded UCI sequence to correctly obtain the first UCI and the second UCI.

In conjunction with the second aspect, in some implementations of the second aspect, the method further includes: determining, by the network device, that the terminal device cascades the first UCI and the second UCI to obtain a first cascaded UCI sequence; when determining that a total number of bits of the first cascaded UCI sequence does not exceed the first preset threshold, decoding the first cascaded UCI sequence in the first-type decoding scheme, or, determining that a padding bit or an occupancy bit is added to the first cascaded UCI sequence by the terminal device till satisfying that the total number of bits of the first cascaded UCI sequence exceeds the first preset threshold, obtaining a padded first cascaded UCI sequence, and decoding, in the second-type decoding scheme, the sequence to which the padding bit or the occupancy bit is added.

In conjunction with the second aspect, in some implementations of the second aspect, the first UCI is $A_1$-bit HARQ-ACK and the second UCI is $A_2$-bit HARQ-ACK, where $A_1$ is equal or unequal to $A_2$, and $A_1+A_2$ does not exceed the first preset threshold; or the first UCI is $A_3$-bit HARQ-ACK, and the second UCI is an SR, and $A_3$ does not exceed the first preset threshold.

In conjunction with the second aspect, in some implementations of the second aspect, when the first UCI is $A_1$-bit HARQ-ACK and the second UCI is $A_2$-bit HARQ-ACK, the method further includes: if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, adopting one of the following methods:

Method 1: determining that the terminal device cascades an X-bit SR with the first UCI and the second UCI to obtain a second cascaded UCI sequence, and decoding the second cascaded UCI sequence in the second-type decoding scheme;

Method 2: determining that the terminal device cascades an X-bit SR with the first UCI and the second UCI to obtain a second cascaded UCI sequence, and when determining that a total number of bits of the second cascaded UCI sequence does not exceed the first preset threshold, decoding the second cascaded UCI sequence in the first-type decoding scheme, or, determining that a padding bit or an occupancy bit is added to the second cascaded UCI sequence by the terminal device till satisfying that a total number of bits of the second cascaded UCI sequence exceeds the first preset threshold, obtaining a padded second cascaded UCI sequence, and decoding the padded second cascaded UCI sequence in the second-type decoding scheme; and when determining that the total number of bits of the second cascaded UCI sequence exceeds the first preset threshold, decoding the second cascaded UCI sequence in the second-type decoding scheme;

where X=ceil(log2(K+1)), ceil( ) is rounding up, and K is a configured number of SRs or a number of SRs meeting the following condition: the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold.

In conjunction with the second aspect, in some implementations of the second aspect, when the first UCI is $A_3$-bit HARQ-ACK and the second UCI is an SR, the method includes:

Method 1: determining that the terminal device cascades an X-bit SR with the first UCI to obtain a third cascaded UCI sequence, and decoding the third cascaded UCI sequence in the second-type decoding scheme; or Method 2: determining that the terminal device cascades an X-bit SR with the first UCI to obtain a third cascaded UCI sequence, and when determining that a total number of bits of the third cascaded UCI sequence does not exceed the first preset threshold, decoding the third cascaded UCI sequence in the first-type decoding scheme, or, determining that a padding bit or an occupancy bit is added to the third cascaded UCI sequence by the terminal device till satisfying that a total number of bits of the third cascaded UCI sequence exceeds the first preset threshold, obtaining a padded third cascaded UCI sequence, and decoding the padded third cascaded UCI sequence in the second-type decoding scheme; and when determining that the total number of bits of the third cascaded UCI sequence exceeds a predetermined threshold, decoding the third cascaded UCI sequence in the second-type decoding scheme;

where X=ceil(log2(K+1)), ceil( ) is rounding up, and K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In conjunction with the second aspect, in some implementations of the second aspect, the method further includes: determining, by the network device, whether a bit number of the first UCI and a bit number of the second UCI respectively exceeds the first preset threshold; when determining that the bit number of the first UCI does not exceed the first preset threshold, decoding, by the network device, the first UCI in the first-type decoding scheme, or, determining that a padding bit or an occupancy bit is added to the first UCI by the terminal device till satisfying that the bit number of the first UCI exceeds the first preset threshold, and decoding the padded first UCI sequence in the second-type decoding scheme when a padded first UCI sequence is obtained; and/or, when determining that the bit number of the second UCI does not exceed the first preset threshold, decoding the second UCI in the first-type decoding scheme, or, determining that a padding bit or an occupancy bit is added to the second UCI by the terminal device till satisfying that the bit number of the second UCI exceeds the first preset threshold, obtaining a padded second UCI sequence, and decoding the padded second UCI sequence in the second-type decoding scheme.

In conjunction with the second aspect, in some implementations of the second aspect, the first UCI is $A_4$-bit HARQ-ACK and the second UCI is $A_5$-bit HARQ-ACK, where $A_4$ is equal or unequal to $A_5$, and at least one of $A_4$ and $A_5$ does not exceed the first preset threshold; or the first UCI is $A_6$-bit HARQ-ACK and the second UCI is an SR, where at least one of a bit number of the SR and $A_6$ does not exceed the first preset threshold, the bit number of the SR is X=ceil(log2(K+1)), ceil( ) is rounding up, K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In conjunction with the second aspect, in some implementations of the second aspect, when the first UCI is $A_4$-bit HARQ-ACK and the second UCI is $A_5$-bit HARQ-ACK, if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, the method further includes:

determining that the terminal device cascades an X-bit SR and first target UCI to obtain a fourth cascaded UCI sequence, where the first target UCI is one of the first UCI and the second UCI; decoding, by the network device respectively in the first-type decoding scheme, each individual sequence within the fourth cascaded UCI sequence and second target UCI for which a bit number exceeds the first preset threshold, or, determining that a padding bit or an occupancy bit is added to each individual sequence by the terminal device till satisfying that a total number of bits exceeds the first preset threshold, and decoding, in the second-type decoding scheme, the sequence to which the padding bit or the occupancy bit is added; and decoding, by the network device in the second-type decoding scheme, each individual sequence within the fourth cascaded UCI sequence and the second target UCI for which a bit number exceeds the first preset threshold; where the second target UCI is UCI other than the first target UCI of the first UCI and the second UCI.

In conjunction with the second aspect, in some implementations of the second aspect, the receiving, by the network device, the decoded first UCI sequence and the decoded second UCI sequence on the same uplink channel includes: when determining that a padding bit or an occupancy bit is added to a UCI sequence by the terminal device, determining, by the network device according to a bit number of the sequence to which the padding bit or the occupancy bit is added, a PUCCH resource for receiving the encoded first UCI sequence and the encoded second UCI sequence.

In conjunction with the second aspect, in some implementations of the second aspect, the first-type decoding scheme is repetition decoding or RM decoding, and the second-type decoding scheme is RM decoding, Polar decoding, LDPC decoding, TBCC decoding or Turbo decoding.

In conjunction with the second aspect, in some implementations of the second aspect, the first UCI and the second UCI is UCI of a same physical layer priority or different physical layer priorities; or the first UCI and the second UCI is respectively one piece of UCI between UCI corresponding to a unicast service and UCI corresponding to a multicast service.

In a third aspect, provided is a UCI transmission apparatus, configured to perform the method in any one of the possible implementations of the first aspect described above. In particular, the apparatus includes a device configured to perform the method in any one of the possible implementations of the first aspect described above.

In a fourth aspect, provided is another UCI transmission apparatus, configured to perform the method in any one of the possible implementations of the second aspect described above. In particular, the apparatus includes a device configured to perform the method in any one of the possible implementations of the second aspect described above.

In a fifth aspect, provided is yet another UCI transmission apparatus. The apparatus includes a processor, where the processor is coupled with a memory, and can be configured to execute instructions in the memory, to implement the method in any one of the possible implementations of the first aspect described above. In an implementation, the apparatus further includes a memory. In an implementation, the apparatus further includes a communication interface coupled with the processor.

In one implementation, the UCI transmission apparatus is a terminal device. When the UCI transmission apparatus is a terminal device, the communication interface may be a transceiver or an input/output interface.

In another implementation, the UCI transmission apparatus is a chip configured in a terminal device. When the UCI transmission apparatus is a chip configured in a terminal device, the communication interface can be an input/output interface.

In a sixth aspect, provided is yet another UCI transmission apparatus. The apparatus includes a processor, where the processor is coupled with a memory, and can be configured to execute instructions in the memory, to implement the method in any one of the possible implementations of the second aspect described above. In an implementation, the apparatus further includes a memory. In an implementation, the apparatus further includes a communication interface coupled with the processor.

In one implementation, the UCI transmission apparatus is a network device. When the UCI transmission apparatus is a network device, the communication interface may be a transceiver or an input/output interface.

In another implementation, the UCI transmission apparatus is a chip configured in a network device. When the UCI transmission apparatus is a chip configured in a network device, the communication interface can be an input/output interface.

In a seventh aspect, provided is a processor. The processor includes: an input circuit, an output circuit and a processing circuit. The processing circuit is configured to receive a signal through the input circuit and transmit a signal through the output circuit and the processor performs the method in any one of the possible implementations throughout the first aspect to the second aspect described above.

During specific implementation, the above-described processor may be a chip; the input circuit may be an input pin; the output circuit may be an output pin; and the processing circuit may be a transistor, a gate circuit, a flip-flop and various logic circuits. The input signal received by the input circuit can be received and input by, for example, but not limited to a receiver; the signal output by the output circuit can be, for example, but not limited to being output to a transmitter and transmitted by the transmitter. In one embodiment, the input circuit and the output circuit can be the same circuit serving respectively as an input circuit and an output circuit at different times. Specific implementations of the processor and various circuits are not limited in embodiments of the present application.

In an eighth aspect, provided is a processing apparatus including a processor and a memory. The processor is configured to read instructions stored in the memory, and can receive a signal through a receiver and transmit a signal through a transmitter to perform the method in any one of the possible implementations throughout the first aspect to the second aspect described above.

In an implementation, the number of the processor is singular or plural and the number of the memory is singular or plural.

In an implementation, the memory can be integrated with the processor, or the memory is arranged separately from the processor.

During specific implementation, the memory may be a non-transitory memory, such as a read only memory (ROM), which may be integrated with the processor on the same chip, or separately arranged on different chips, the type of the memory and the manner in which the memory and the processor are arranged are not limited in embodiments of the present application.

It should be understood that a related data interaction process, for example, indication information transmitting may be a process to output indication information from the processor, and capability information receiving may be a process for the processor to receive input capability information. the data output by the processor may be output to the transmitter, and the input data received by the processor may come from the receiver. The transmitter and the receiver can be collectively referred to as a transceiver.

The processing apparatus in the eighth aspect described above may be a chip, and the processor can be implemented by hardware or software. When being implemented by hardware, the processor may be a logic circuit, an integrated circuit, or the like; when being implemented by software, the processor may be a general-purpose processor which is implemented by reading software codes stored in the memory, and the memory may be integrated in the processor, or is standalone independently of the processor.

In a ninth aspect, provided is a computer program product. The computer program product includes a computer program (which may also be referred to as codes or instructions), where the computer program, when running, enables a computer to execute the method in any one of the possible implementations throughout the first aspect to the second aspect described above.

In a tenth aspect, provided is a computer-readable storage medium. The computer-readable storage medium has, stored therein, a computer program (which may also be referred to as codes or instructions), where the computer program, when running on a computer, enables the computer to execute the method in any one of the possible implementations throughout the first aspect to the second aspect described above.

DESCRIPTION OF EMBODIMENTS

The embodiments in the present application will be described hereunder in conjunction with the accompanying drawings.

Figure 1:
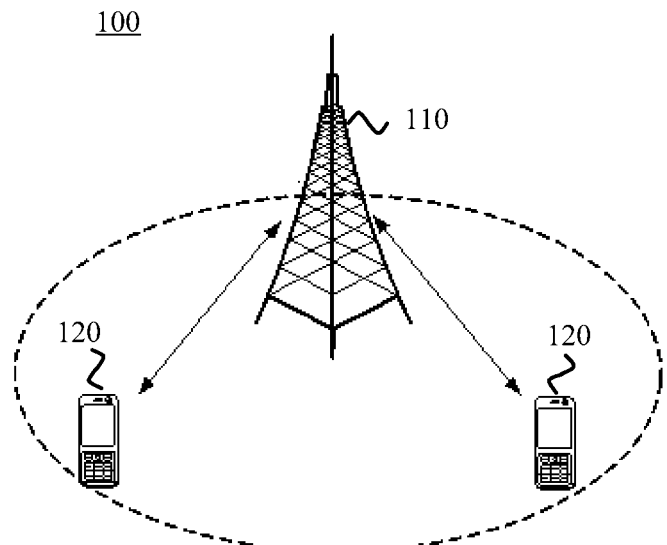
FIG. 1 is a schematic diagram of a communication system according to an embodiment of the present application.

Exemplarily, FIG. 1 is a schematic diagram of a communication system according to an embodiment of the present application. In the communication system as shown in FIG. 1, description is made by taking an example where the communication system 100 includes one network device 110 and two terminal devices 120. Understandably, the communication system 100 may include multiple network devices, and other numbers of terminal devices may be included within the coverage of each of the network devices, which is not limited in the embodiments of the present application.

The network device 110 may be a device that communicates with a terminal device 120 (also referred to as a communication terminal or a terminal). The network device 110 may provide a particular geographic area with communication coverage and may communicate with a terminal device located within the coverage.

The communication system 100 may be a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolutional system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, a wireless local area network (WLAN), wireless fidelity (Wi-Fi), a next generation communication system, or other communication systems.

In an implementation, the NR system may also be referred to as a 5G system or a 5G network.

In general, traditional communication systems support a limited number of connections and are also easy to implement. However, with development of the communication technology, mobile communication systems will not only support traditional communications, but also support, for example, device to device (D2D) communication, machine to machine (M2M) communication, machine type communication (MTC), and vehicle to vehicle (V2V) communication, etc., and the embodiments of the present application can also be applied to these communication systems.

In an implementation, the network device 110 may be a base station (Base Transceiver Station, BTS) in the GSM system or the CDMA system, or a base station (NodeB, NB) in the WCDMA system, or an evolved base station (Evolutional Node B, eNB or eNodeB) in the LTE system, or a radio controller in a cloud radio access network (CRAN), in one embodiment, the network device may be a mobile switching center, a relay station, an access point, a vehicle-mounted device, a wearable device, a hub, a switch, a network bridge, a router, a network side device in the 5G network, a network device in a future evolutional public land mobile network (PLMN), or the like.

When the communication system is an NR system, the network device 110 may be a(n) (radio) access network ((R)AN) device in the NR system. The (R)AN device in the NR system may be: a non-3GPP access network such as an access point (AP) of a WiFi network, a next-generation base station (which can be collectively referred to as a new generation radio access network node (NG-RAN node), where the next-generation base station includes a new radio base station (NR nodeB, gNB), a next-generation evolutional base station (NG-eNB), a central unit (CU) and distributed unit (DU) separated gNB, and the like), a new radio controller (NR controller), a remote radio module, a micro base station, a relay, a transmission receive point (TRP), a transmission point (TP) or other node.

It should be understood that the terminal device 120 in the embodiments of the present application may refer to a user equipment, an access terminal, a subscriber unit, a subscriber station, a mobile station, a mobile platform, a remote station, a remote terminal, a mobile device, a user terminal, a terminal, a wireless communication device, a user agent or a user apparatus. The terminal device may also be a cellular telephone, a cordless telephone, a session initiation protocol (SIP) telephone, a wireless local loop (WLL) station, a personal digital assistant (PDA), a handheld device with wireless communication capabilities, a computing device or other processing devices connected to a wireless modem, a vehicle-mounted device, a wearable device, a terminal device in the 5G network, or a terminal device in the future evolutional public land mobile network (PLMN) or the like, which is not limited in the embodiments of the present application.

By way of example but not limitation, in an embodiment of the present application, the terminal device 120 may also be a wearable device. The wearable device can also be referred to as a wearable smart device, which is a generic term for wearable devices developed from the application of wearable technology to intelligently design daily wears, such as glasses, gloves, watches, clothes, and shoes. The wearable device is a portable device that is worn directly on one's body or integrated into a user's clothes or accessories. The wearable device is not only a hardware device, but also implements powerful functions through software support, data interaction and cloud interaction. Generalized wearable smart devices include those that are fully-featured and large-sized and that can implement complete or partial functions without relying on smartphones, e.g., smart watches or smart glasses, etc., and those that only focus on a type of application function and those need to be used in cooperation with other devices such as smartphones, e.g., various smart bracelets for physical sign monitoring, smart jewelries, etc.

In addition, in the embodiments of the present application, the terminal device 120 may also be a terminal device in an IoT system, where IoT is an important part of the future development of information technology, and its main feature is to connect an item to a network through communication technology, to realize an intelligent network of human-machine interconnection and interconnection of things. In the embodiments of the present application, the IoT technology can accomplish massive connection, deep coverage and terminal-side power saving, by means of narrow band NB technology, for example.

Further, in the embodiments of the present application, the terminal device may also be a terminal device using device-to-device (D2D) communication technology. The D2D technology refers to a communication scheme in which two peer terminal devices directly communicate. In a decentralized network composed of D2D terminal devices, each terminal device node can transmit and receive signals, and has a function of automatic routing (message forwarding).

In addition, in the embodiments of the present application, the terminal device may also include a smart printer, a train detector, a sensor for a gas station and others, the main functions of which include collecting data (some terminal devices), receiving control information and downlink data of a network device and transmitting electromagnetic waves, and transmitting uplink data to the network device.

It should be understood that the device having a communication function in the network/system according to the embodiments of the present application may be referred to as a communication device. Taking the communication system 100 shown in FIG. 1 as an example, the communication device may include a network device 110 and a terminal device 120 that have communication functions, the network device 110 and the terminal device 120 may be specific devices described above, and details will not be described here again. The communication device may also include other devices in the communication system 100, such as a network controller, a mobility management entity and other network entities, which is not limited in the embodiments of the present application.

It should be understood that the terminal device and the network device in the embodiments of the present application support simultaneous transmission of different UCI on a same uplink channel.

Before introducing the UCI transmission method according to the embodiment of the present application, the following points will be explained firstly.

First, in the embodiments shown below, terms and English abbreviations, such as first UCI, a first preset threshold and the like, are exemplary examples given for convenience of description and shall not constitute any limitation of the present application. The present application does not exclude the possibility of defining, in existing or future protocols, other terms capable of implementing the same or similar functions.

Second, in the embodiments shown below, distinction among terms such as first, second, and various numerical numbers is only for the convenience of description, and is not intended to limit the scope of the embodiments of the present application, for example, for distinguishing different UCI, etc.

Third, the "at least one" refers to one or more and "a plurality of" refers to two or more. The "and/or" is intended to describe an association relationship between associated objects, indicating that there can be three relationships, for example, A and/or B may represent the following cases: the presence of A alone, the presence of both A and B, and the presence of B alone, where A and B each can be singular or plural. The character "/" generally indicates that contextually associated objects are in an "or" relationship. The "at least one of the following" or an expression similar thereto means any combination of these items, including a single item or any combination of plural items. For example, at least one of a, b and c may indicate: a; or b; or c; or a and b; or a and c; or b and c; or a, b and c, where a, b and c each can be singular or plural.

For ease of understanding, a brief introduction is made hereunder to relevant concepts involved in the embodiments of the present application.

In the 5G NR system, one user equipment (UE) can support multiple different service types, e.g., an enhanced mobile broadband (eMBB) service and an ultra-reliable and low latency communication (URLLC) service. In one embodiment, different service types have different requirements for reliability and transmission latency.

Exemplarily, URLLC service traffic may occur loosely and irregularly, so different system resources will be reserved separately for different services; however, in some cases, the resources reserved for URLLC are not used, which will cause large overheads and a waste of system resources. In order to improve the utilization of system resources, a UE can support multiplexing transmission of different services on a same resource.

In one possible implementation, when a URLLC service arrives after a UE is scheduled to transmit an eMBB service on resource 1, in order to meet delay requirements of the URLLC service, all or part of resources (including time domain resources and/or frequency domain resources) in resource 1 allocated to the eMBB service may be occupied for URLLC transmission.

In another possible implementation, in order to meet the delay requirements of the URLLC service, all or part of symbols in time domain resources (a collection of symbols) scheduled to the eMBB service on a same carrier may be scheduled for the URLLC transmission, regardless of whether or not frequency domain resources overlap. Since it is impossible to transmit two uplink channels at the same time on the same carrier, the eMBB service would be interrupted or canceled by the URLLC service.

Therefore, in order to better support transmission of different services with different requirements and avoid interaction between services, different physical layer priorities can be defined for different services. When uplink channels with different physical layer priorities conflict, UCI carried by a low-priority uplink channel may be discarded and only UCI carried by a high-priority uplink channel is transmitted.

It should be understood that the above-described uplink channels can be PUCCHs, or physical uplink shared channels (PUSCH).

The uplink channels with different physical layer priorities conflicting as described above can be interpreted as: multiple uplink channels transmitted on a same carrier overlapping in a time domain; or multiple uplink channels transmitting on a same carrier having a transmission time interval less than a preset threshold (applied in a high-frequency scenario).

Exemplarily, the UCI includes at least one of hybrid automatic repeat request-acknowledgment (HARQ-ACK), channel state information (CSI) and a scheduling request (SR), and the UCI is transmitted on a PUCCH or a PUSCH.

Among them, the HARQ-ACK is a collective term for acknowledgment (ACK) and non-acknowledgment (NACK), and is used to give a feedback for a physical downlink shared channel (PDSCH) or a physical downlink control channel (PDCCH) indicating semi-persistent scheduling (SPS) resource release, to notify the base station whether the PDSCH or the PDCCH indicating the SPS PDSCH release is received correctly.

The CSI is used to feedback the quality of a downlink channel, to help the base station better perform downlink scheduling, for example, performing modulation and coding scheme (MCS) selection and appropriate resource block (RB) configuration depend on the CSI.

The SR is used, when the terminal device has an uplink service to transmit, to request, from the base station, a transmission resource for a PUSCH carrying the uplink service.

Physical layer priorities of PUCCHs and PUSCHs can be obtained by default, dynamically indicated by downlink control information (DCI), or semi-statically configured by radio resource control (RRC).

Exemplarily, when PUCCHs carry SRs, their physical layer priorities are determined by priorities corresponding to the carried SRs, and the priority corresponding to each SR is configured by higher layer signaling.

Exemplarily, when PUCCHs carry HARQ-ACK of SPS PDSCHs or carry HARQ-ACK of PDCCHs indicating SPS resource release, their physical layer priorities are determined by HARQ-ACK codebook numbers configured by higher layer signaling for the SPS PDSCHs. The HARQ-ACK codebook corresponding to number 0 is at a low priority, and the HARQ-ACK codebook corresponding to number 1 is at a high priority.

Exemplarily, when PUCCHs carry CSI, their physical layer priorities are considered to be low by default. The CSI can be periodic CSI or semi-persistent channel state information (semi-persistent CSI, SP-CSI)

Exemplarily, if DCI used by a PDCCH contains a priority indication field: when the PDCCH schedules a PDSCH, the priority of a PUCCH carrying HARQ-ACK of the PDSCH can be indicated through the priority indication field; or when the PDCCH schedules a PUSCH, the priority of the scheduled PUSCH can be indicated through the priority indication field, where the PUSCH includes a PUSCH carrying a transport block (TB) and/or aperiodic channel state information (aperiodic CSI, A-CSI). For a PUSCH carrying SP-CSI, its priority can be obtained by activating a priority indication field in DCI of the PUSCH carrying the SP-CSI.

Exemplarily, when the DCI used by the PDCCH does not contain a priority indication field or when a priority is not configured by higher layer signaling, there is a low priority by default.

In the 5G NR system, five PUCCH formats (hereinafter represented by PF) are defined, i.e., NR PUCCH formats 0, 1, 2, 3 and 4. Among them, PFs 0 and 1 can carry 1 to 2 bits of UCI transmission; PFs 2, 3 and 4 can carry more than 2 bits of UCI transmission; PFs 0 and 2 belong to a short PUCCH, occupying 1 to 2 symbols for transmission; and PFs 1, 3 and 4 belong to a long PUCCH, which can occupy 4 to 14 symbols for transmission.

Exemplarily, an SR can be transmitted using PF 0 or 1, and HARQ-ACK can be transmitted using any of the five PFs.

The 5G NR system does not support concurrent transmission of multiple PUCCHs at the same time on a carrier for PUCCH transmission. When some UCI with different physical layer priorities are subject to multiplexing transmission on a same uplink channel, there may be a resource conflict, for example, on a same carrier, symbols occupied by uplink channels with different priorities overlap. In order to avoid the power limitation problem caused by a peak to average power ratio (PAPR) rise resulting from the conflict, it is necessary to transmit only UCI with a high physical layer priority among conflicting channels and discard UCI with a low physical layer priority, resulting in impacts on low-priority services.

Exemplarily, if low-priority HARQ-ACK is discarded, low-priority downlink transmission will not be fed back in time, resulting in unnecessary retransmission; and if a low-priority SR is discarded, the base station cannot obtain scheduling requests for low-priority services, and the base station will not transmit an uplink grant (UL grant) for scheduling to the terminal device in time, resulting in that uplink services cannot be transmitted in time.

In addition, for terminal devices that have both unicast and multicast (or broadcast) services, HARQ-ACK of unicast and multicast (or broadcast) services of the terminal devices may also conflict.

In light of this, embodiments of the present application provide a UCI transmission method and apparatus, which can support, on a same carrier, multiplexing transmission of UCI with different priorities on a same channel, to avoid impacts on low-priority services resulting from discarding the UCI carried on the low-priority uplink channel.

In one possible implementation, when a predetermined time condition is met, it is possible to perform multiplexing transmission of UCI on multiple PUCCHs according to different UCI types and PFs used by the UCI. In this multiplexing transmission method, HARQ-ACK and an SR are configured with different NR PFs, including the following:

(1) when a PUCCH carrying the SR overlaps with a PUCCH carrying the HARQ-ACK and the PUCCH carrying the HARQ-ACK uses PF 0 (the PUCCH carrying the SR may use PF 0 or PF 1), multiplexing transmission of the SR and the HARQ-ACK is performed on the PUCCH resource for the HARQ-ACK, that is, on the PUCCH resource for the HARQ-ACK, the HARQ-ACK is transmitted by selecting to use a cyclic shift (CS) corresponding to the HARQ-ACK when whether a positive SR or a negative SR exists accordingly, implicitly expressing either the positive SR or the negative SR;

(2) when a PUCCH carrying the SR overlaps with a PUCCH carrying the HARQ-ACK, and the PUCCH carrying the SR uses PF 0 while the PUCCH carrying the HARQ-ACK uses PF 1, the SR is discarded, that is, no multiplexing transmission is performed at this point;

(3) when a PUCCH carrying the SR overlaps with a PUCCH carrying the HARQ-ACK, and the PUCCH carrying the SR uses PF 1 while the PUCCH carrying the HARQ-ACK also uses PF 1, the HARQ-ACK is transmitted on the PUCCH resource for the SR under a circumstance that there is a positive SR, and simultaneous SR transmission is implicitly expressed by transmitting the HARQ-ACK by using the PUCCH resource corresponding to the SR; and the HARQ-ACK is transmitted on the PUCCH resource for the HARQ-ACK under a circumstance that there is a negative SR;

(4) when a PUCCH carrying the SR overlaps with a PUCCH carrying the HARQ-ACK and the PUCCH carrying the HARQ-ACK uses PF 2 or 3 or 4 (the PUCCH carrying the SR may use PF 0 or PF 1), a set of PUCCH resources is determined according to a total number of bits of the SR and the HARQ-ACK, and according to a PUCCH resource indication field in DCI corresponding to the HARQ-ACK, a PUCCH resource is determined from the determined set of PUCCH resources, for simultaneous transmission of the SR and the HARQ-ACK. Where the SR has K bits, indicating a state of the SR among X SRs overlapping with the HARQ-ACK (which one is positive or all of them are negative), that is, regardless of the SR being a positive SR or a negative SR, the K-bit SR is always transmitted to avoid a change of the bit number of UCI transmitted on the PUCCH resource for the HARQ-ACK due to the SR state.

In the above-described possible implementations, it is necessary to define different multiplexing transmission schemes for different combinations between different bits of different UCI and different PFs, which is complex to operate.

In addition, when the PUCCH carrying the SR (regardless of the SR being a positive SR or a negative SR) uses PF 0 or 1 and the PUCCH carrying the HARQ-ACK uses PF 2 or 3 or 4, it is possible to simultaneously transmit the SR and the HARQ-ACK on one PUCCH resource. However, when the PUCCH carrying the HARQ-ACK uses PF 0 or 1, that is, when transmitting 1-bit or 2-bit HARQ-ACK, it is impossible to simultaneously transmit the SR and the HARQ-ACK on one PUCCH resource, explicitly.

In light of this, the UCI transmission method according to the embodiments of the present application is proposed for the above-described situation in which multiplexing transmission is needed for 1-bit or 2-bit UCI when the PUCCH carrying the HARQ-ACK uses PF 0 or 1, by means of bit adding or adopting an encoding scheme supporting a smaller bit number, it is conducive to achieving multiplexing transmission in the case of a small bit number (that is, the UCI has a bit number of 1 or 2) when multiple types of UCI conflict, which can avoid the impacts resulting from discarding a type of UCI, and is convenient to operate and easy to implement.

It should be understood that the UCI transmission method according to the embodiments of the present application is also applicable to multiplexing transmission in the case of a large bit number (that is, the UCI has a bit number greater than 2) when multiple types of UCI conflict, and the bit number of the UCI is not limited in the present application.

Detailed description will be given hereunder to the UCI transmission method according to the present application in conjunction with FIG. 2.

Figure 2:
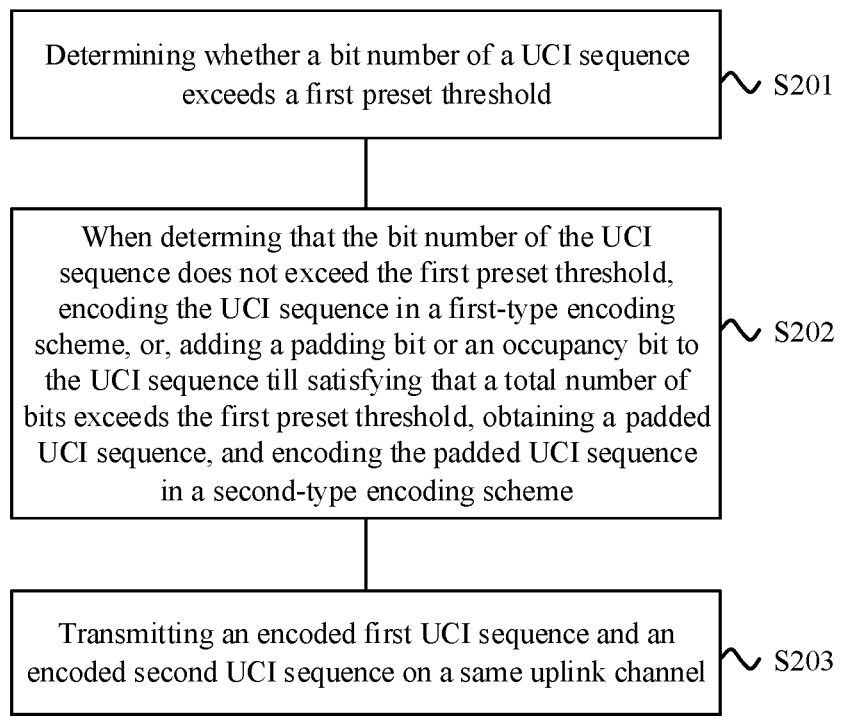
FIG. 2 is a schematic flow diagram of a UCI transmission method according to an embodiment of the present application.

Exemplarily, FIG. 2 is a schematic flow diagram of a UCI transmission method 200 according to an embodiment of the present application, which may be executed by a terminal device. The method 200 includes the following steps.

S201: determining whether a bit number of a UCI sequence exceeds a first preset threshold.

The UCI sequence includes first UCI and second UCI, and a first uplink channel carrying the first UCI and a second uplink channel carrying the second UCI overlap in a time domain or a transmission time interval between the first uplink channel carrying the first UCI and the second uplink channel carrying the second UCI is less than a second preset threshold.

S202, when determining that the bit number of the UCI sequence does not exceed the first preset threshold, encoding the UCI sequence in a first-type encoding scheme, or, adding a padding bit or an occupancy bit to the UCI sequence till satisfying that a total number of bits exceeds the first preset threshold, obtaining a padded UCI sequence, and encoding the padded UCI sequence in a second-type encoding scheme.

S203, transmitting an encoded first UCI sequence and an encoded second UCI sequence on a same uplink channel.

In the embodiment of the present application, when there is a conflict between a first uplink channel carrying the first UCI and a second uplink channel carrying the second UCI, the terminal device may encode different UCI with different bit numbers in an encoding manner, to achieve the objective of transmitting some different UCI on the same uplink channel. When transmitting UCI in an encoding method, depending on different encoding rules, the UCI sequence refers to different contents in the case of determining whether the bit number of the UCI sequence exceeds the first preset threshold. If the first UCI and the second UCI adopt a joint encoding rule, that is, when the first UCI and the second UCI is informatively cascaded for encoding, in S201 of determining whether the bit number of the UCI sequence exceeds the first preset threshold as described above, the UCI sequence refers to a sequence after cascading the first UCI and the second UCI, that is, at this point, the UCI sequence including the first UCI and the second UCI refers to the sequence after cascading the first UCI and the second UCI. If the first UCI and the second UCI adopt an separate encoding rule, that is, when encoding the first UCI and the second UCI, respectively, in S201 of determining whether the bit number of the UCI sequence exceeds the first preset threshold as described above, the UCI sequence refers to one of the first UCI and the second UCI, for example, it refers to the first UCI when encoding the first UCI, and it refers to the second UCI when encoding the second UCI, since the first UCI and the second UCI is to be transmitted simultaneously, that is, the terminal needs to encode the first UCI and the second UCI separately, that is to say, the first UCI and the second UCI will be encoded, that is, at this point, the UCI sequence including the first UCI and the second UCI refers to processing the first UCI and the second UCI, respectively.

Correspondingly, depending on different encoding schemes from the terminal device, the network device needs to determine corresponding decoding schemes to decode the UCI sequence subjected to encoding or other processing, to correctly decode the first UCI and the second UCI.

The above-described first-type encoding scheme is repetition encoding and RM encoding, where the repetition encoding may be an encoding scheme used when transmitting 1-bit or 2-bit HARQ-ACK on a PUSCH; and the RM encoding may be RM (24, O1) encoding or RM (32, O2) encoding, where O1 and O2 are bit numbers of a to-be-encoded UCI sequence input to an encoder, O1 can be 1 to 13, and O2 can be 1 to 11.

The above-described second-type encoding scheme is RM encoding, Polar encoding, low density parity check (LDPC) encoding, tail biting convolutional coding (TBCC) encoding, or Turbo encoding.

The above-described first preset threshold can be 2 bits (other bit numbers are not excluded).

The above-described padding bit or occupancy bit can be a repetition of the UCI bit or a preset bit state, such as a fixed padding of "1" or "0", or a fixed sequence of "1" and "0".

It should be understood that the first UCI and the second UCI may have a same physical layer priority or different physical layer priorities.

In an implementation, the first UCI and the second UCI is respectively one piece of UCI between UCI corresponding to a unicast service and UCI corresponding to a multicast service, for example, the first UCI is UCI corresponding to a unicast service, and the second UCI is UCI corresponding to a multicast service; in one embodiment, the first UCI is UCI corresponding to a multicast service, and the second UCI is UCI corresponding to a unicast service.

The method 200 can be performed in a same carrier group, that is, the first uplink channel carrying the first UCI and the second uplink channel carrying the second UCI belong to the same carrier group, that is to say, the above-described conflict refers to a conflict occurring in the same carrier group, and a conflict between uplink channels in different carriers may not be performed in accordance with the method 200.

The method 200 may be performed in a situation allowing or configuring multiplexing transmission of the first UCI and the second UCI on the same uplink channel.

There being a conflict between the first uplink channel and the second uplink channel can be interpreted as: the first uplink channel and the second uplink channel overlap in a time domain; or a transmission time interval between the first uplink channel and the second uplink channel is less than the first preset threshold.

Understandably, when the first uplink channel and the second uplink channel do not overlap in the time domain, it is also possible that a transmission time interval between an end symbol of the first uplink channel (assuming that the first uplink channel is a channel with an earlier start time) and a start symbol of the second uplink channel (assuming that the second uplink channel is a channel after the first uplink channel) is less than the first preset threshold, and continuous transmission (such as a scenario in which adjustment of radio frequency devices is needed in high-frequency transmission) is impossible although the two channels do not overlap. Therefore, multiplexing transmission needs to be performed on a same uplink channel for the first UCI and the second UCI carried on the two channels.

In an embodiment of the present application, the first UCI and the second UCI may be handled in two ways, one of which is to perform joint processing on the first UCI and the second UCI, and the other one of which is to perform separate processing on the first UCI and the second UCI. Detailed introduction will be made hereunder firstly to different encoding schemes of UCI with different bit numbers under the joint processing scheme.

As an optional embodiment, when the first UCI and the second UCI adopt a joint encoding scheme (that is, encoding a cascaded sequence of the first UCI and the second UCI by using the first-type encoding scheme, i.e., the first UCI and the second UCI is encoded together), the terminal device cascades the first UCI and the second UCI to obtain a first cascaded UCI sequence. When determining that a total number of bits of the first cascaded UCI sequence does not exceed the first preset threshold, the terminal device encodes the first cascaded UCI sequence in the first-type encoding scheme, or, adds a padding bit or an occupancy bit to the first cascaded UCI sequence till satisfying that the total number of bits of the first cascaded UCI sequence exceeds the first preset threshold, obtains a padded first cascaded UCI sequence, and encodes the padded first cascaded UCI sequence in the second-type encoding scheme.

As an optional embodiment, the first UCI is $A_1$-bit HARQ-ACK and the second UCI is $A_2$-bit HARQ-ACK, where $A_1$ is equal or unequal to $A_2$, and $A_1+A_2$ does not exceed the first preset threshold; or the first UCI is $A_3$-bit HARQ-ACK, and the second UCI is an SR, and $A_3$ does not exceed the first preset threshold.

Detailed description will be given hereunder to different encoding schemes under the joint processing scheme for UCI with different bit numbers by taking illustrations in FIG. 3 as an example where: the first UCI is high-priority HARQ-ACK with $A_1$ bits (hereinafter briefly as an HP AN), the second UCI is low-priority HARQ-ACK with $A_2$ bits (hereinafter briefly as an LP AN), $A_1$ being equal or unequal to $A_2$, and $A_1+A_2$ not exceeding the first preset threshold, and the uplink channels are PUCCHs. There is a conflict between the PUCCH carrying the HP AN and the PUCCH carrying the LP AN.

Figure 3:
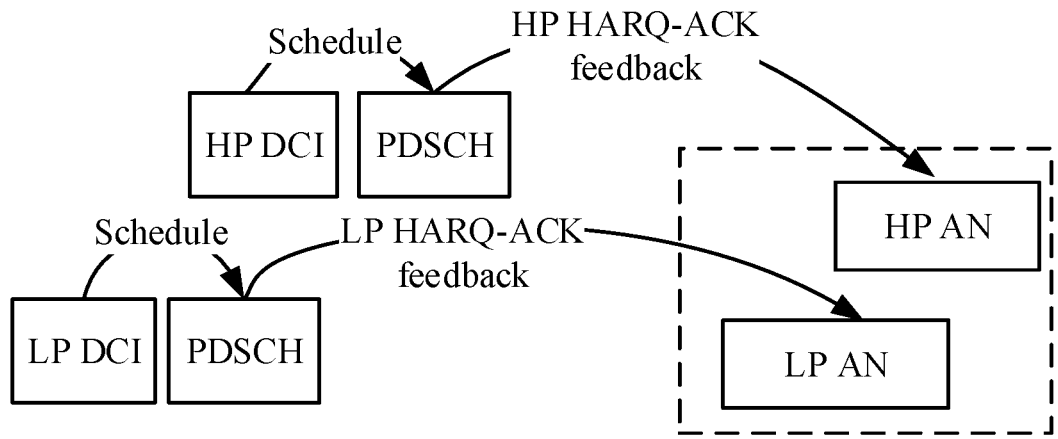
FIG. 3 is a schematic diagram of UCI priority determination according to an embodiment of the present application.
Figure 4:
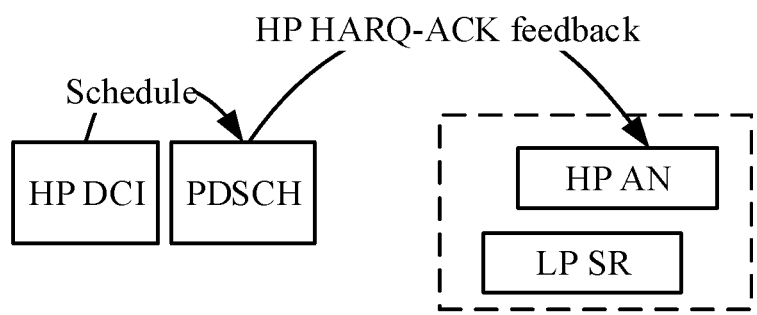
FIG. 4 is another schematic diagram of UCI priority determination according to an embodiment of the present application.
Figure 5:
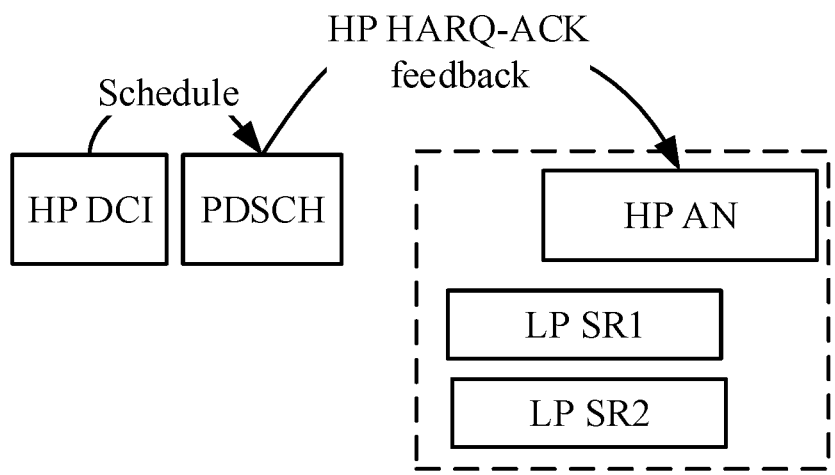
FIG. 5 is yet another schematic diagram of UCI priority determination according to an embodiment of the present application.
Figure 6:
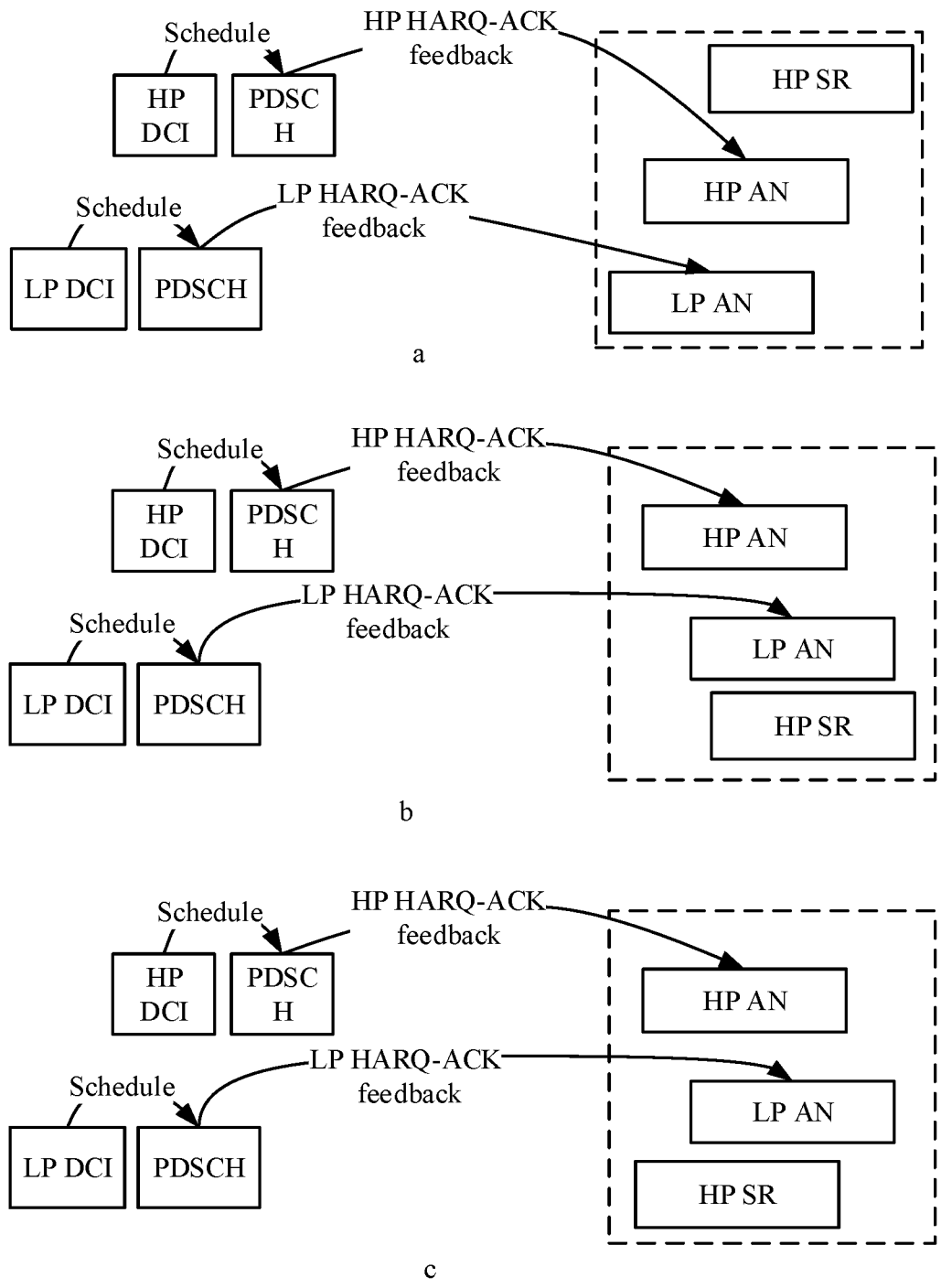
FIG. 6 is yet still another schematic diagram of UCI priority determination according to an embodiment of the present application.

In FIG. 3, when HP DCI schedules a PDSCH, a priority indication field in the HP DCI may indicate that the priority of a PUCCH carrying HARQ-ACK of this PDSCH is a high priority, and thus high-priority HARQ-ACK, that is, the HP AN, can be determined. Similarly, a priority indication field in LP DCI may indicate that the priority of a PUCCH carrying HARQ-ACK of this PDSCH is a low priority, and thus low-priority HARQ-ACK, that is, the LP AN, can be determined. FIG. 4 to FIG. 6 hereinafter have the similar descriptions to those here, and hence details will not be described again.

Assuming that the terminal device can support multiplexing transmission of HARQ-ACK with different priorities on a same PUCCH (that is, simultaneous transmission), where the first UCI and the second UCI is in a same carrier group, for example, when secondary carrier components (SCC) are configured for PUCCH transmission, primary and secondary PUCCH groups are in one carrier group, respectively. For another example, in a dual-connection scenario, when a secondary cell group (SCG) is configured, a master cell group (MCG) and the SCG are in one carrier group, respectively.

Exemplarily, when $A_1$ takes a value of 1, $A_2$ takes a value of 1, and the second preset threshold is 2 bits, a 1-bit HP AN and a 1-bit LP AN are cascaded to obtain a 2-bit first cascaded UCI sequence. Since the bit number of the first cascaded UCI sequence does not exceed the first preset threshold, the following two cases are considered where multiplexing transmission is performed by means of encoding.

(1) The terminal device encodes the 2-bit first cascaded UCI sequence by means of repetition encoding or RM encoding, and after different processing such as scrambling, modulation, mapping and the like, then transmits the processed first cascaded UCI sequence through a determined PUCCH resource.

Exemplarily, the terminal device may determine a set of PUCCH resources according to the bit number of the first cascaded UCI sequence, and then determine, according to a PUCCH resource indication field in DCI corresponding to the AN, a PUCCH resource from the set of PUCCH resources for multiplexing transmission.

It should be understood that the step for determining the PUCCH by the terminal device is the same as that here, and thus details will not be described here again.

(2) The terminal device adds a 1-bit padding bit or occupancy bit to the tail of the 2-bit first cascaded UCI sequence or any other position thereof to obtain a 3-bit padded first cascaded UCI sequence, and encodes the 3-bit padded first cascaded UCI sequence by means of RM encoding, Polar encoding, LDPC encoding, TBCC encoding or Turbo encoding, and after different processing such as scrambling, modulation, mapping and the like, then transmits the processed new cascaded UCI sequence through a determined PUCCH resource.

Exemplarily, the terminal device may determine a set of PUCCH resources according to the bit number of the padded first cascaded UCI sequence, and then determine, according to a PUCCH resource indication field in DCI corresponding to the AN, a PUCCH resource from the set of PUCCH resources for multiplexing transmission.

Adding 1-bit padding bit or occupancy bit as described above may be to add 1 bit "0", add 1 bit "1", add repetition information of a 1-bit HP AN, or add repetition information of a 1-bit LP AN, etc. There may be any other form of padding bit and occupancy bit, which is not limited in the embodiments of the present application herein.

Exemplarily, assuming that $A_1$ takes a value of 1, $A_2$ takes a value of 2, and the second preset threshold is 2 bits, a 1-bit HP AN and a 2-bit LP AN are cascaded to obtain a 3-bit first cascaded UCI sequence. Since the bit number of the first cascaded UCI sequence exceeds the first preset threshold, the following case is considered where multiplexing transmission is performed by means of encoding:

the terminal device encodes the 3-bit AN cascaded sequence by means of RM encoding, Polar encoding, LDPC encoding, TBCC encoding or Turbo encoding, and after different processing such as scrambling, modulation, mapping and the like, then transmits the processed first cascaded UCI sequence through a determined PUCCH resource.

In an embodiment of the present application, under the joint processing scheme, if a total number of bits of the cascaded sequence of the first UCI and the second UCI exceeds the first preset threshold, encoding can be performed directly in the second-type encoding scheme.

For the network device, the processing procedure is similar to the execution steps of the terminal device as described above, exemplarily, the network device can determine that the terminal device adds a 1-bit padding bit or occupancy bit to the 2-bit first cascaded UCI sequence to obtain a new sequence, thus it can be determined that the number of bits of the new sequence input to the encoder is 3, and then the network device receives, on a determined PUCCH resource, target encoding information obtained from encoding and other processing, and decodes the target encoding information by means of RM encoding, Polar encoding, LDPC encoding, TBCC encoding or Turbo encoding to obtain 3-bit information, and extracts first two bits as the HP AN and the LP AN, respectively.

In a scenario of multiplexing transmission of UCI with small bit numbers, $A_1$ and $A_2$ may take a value of 1 or 2, respectively, and the value of $A_1$ can be equal or unequal to the value of $A_2$.

In the joint processing scheme, the first UCI may also be a high-priority SR (hereinafter briefly as HP SR) or a low-priority SR (hereinafter briefly as LP SR), the second UCI may also be an HP SR or an LP SR, or other different service types, such as CSI, which is not limited in the embodiments of the present application.

As an optional embodiment, when the first UCI is $A_3$-bit HARQ-ACK and the second UCI is an SR, the following are included:

Method 1: determining that the SR has a bit number of X bits, cascading the X-bit SR with the first UCI to obtain a third cascaded UCI sequence, and encoding the third cascaded UCI sequence in the second-type encoding scheme; or Method 2: determining that the SR has a bit number of X bits, cascading the X-bit SR with the first UCI to obtain a third cascaded UCI sequence, and when determining that a total number of bits of the third cascaded UCI sequence does not exceed the first preset threshold, encoding the third cascaded UCI sequence in the first-type encoding scheme, or, adding a padding bit or an occupancy bit to the third cascaded UCI sequence till satisfying that a total number of bits of the third cascaded UCI sequence exceeds the first preset threshold, obtaining a padded third cascaded UCI sequence, and encoding the padded third cascaded UCI sequence in the second-type encoding scheme; and when determining that the total number of bits of the third cascaded UCI sequence exceeds a predetermined threshold, encoding the third cascaded UCI sequence in the second-type encoding scheme;

where X=ceil(log2(K+1)), ceil( ) is rounding up, and K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

As shown in FIG. 4, when an LP SR overlaps with an $A_3$-bit HP AN, the terminal device determines that a bit number X of the SR is 1; when the bit number of the HP AN is 1, and the first preset threshold is 2 bits, the 1-bit HP AN and the 1-bit LP SR are cascaded to obtain a 2-bit third cascaded UCI sequence. Since the bit number of the third cascaded UCI sequence does not exceed the first preset threshold, the above-described case is considered where multiplexing transmission is performed using Method 2.

(1) The terminal device encodes the 2-bit third cascaded UCI sequence by means of repetition encoding or RM encoding, and after different processing such as scrambling, modulation, mapping and the like, then transmits the processed third cascaded UCI sequence through a determined PUCCH resource.

(2) The terminal device adds a 1-bit padding bit or occupancy bit to the tail of the 2-bit third cascaded UCI sequence or any other position thereof to obtain a 3-bit padded third cascaded UCI sequence, and encodes the 3-bit padded third cascaded UCI sequence by means of RM encoding, Polar encoding, low density parity check (LDPC) encoding, tail biting convolutional coding (TBCC) encoding or Turbo encoding, and after different processing such as scrambling, modulation, mapping and the like, then transmits the processed third cascaded UCI sequence through a determined PUCCH resource.

The terminal device determines that the bit number X of the SR is 1, and when the bit number of the HP AN is 2 and the first preset threshold is 2 bits, the 2-bit HP AN and the 1-bit SR are cascaded to obtain a 3-bit third cascaded UCI sequence. Since the bit number of the UCI cascaded sequence exceeds the first preset threshold, the above-described case is considered where multiplexing transmission is performed using Method 1:

the terminal device encodes the UCI cascaded sequence by means of RM encoding, Polar encoding, LDPC encoding, TBCC encoding or Turbo encoding, and after different processing such as scrambling, modulation, mapping and the like, then transmits the third cascaded UCI sequence through a determined PUCCH resource.

It should be understood that the above-described SR may also be an HP SR, that is, the SR has the same priority as that of the HP AN, which is not limited in the embodiments of the present application. The above-described SR may also have a bit number of 2 bits or 3 bits or other numerical values, and when the SR has a bit number of 2 bits, it can be cascaded with the 1-bit or 2-bit HP AN directly, the UCI cascaded sequence is encoded by means of RM encoding, Polar encoding, LDPC encoding, TBCC encoding or Turbo encoding, and after different processing such as scrambling, modulation, mapping and the like, then the processed cascaded UCI sequence is transmitted through a determined PUCCH resource.

As shown in FIG. 5, when there are multiple LP SRs (e.g., LP SR1 and LP SR2) which overlap with an HP AN, the terminal device determines that the bit number X of the LP SRs is 2. It is assumed that the bit number of the HP AN is 1, when the second preset threshold is 2 bits, the 1-bit HP AN and the 2-bit LP SRs are cascaded to obtain a 3-bit UCI cascaded sequence. Since the bit number of the UCI cascaded sequence is greater than the second preset threshold, the 3-bit UCI cascaded sequence is encoded by means of RM encoding, Polar encoding, LDPC encoding, TBCC encoding or Turbo encoding, and after different processing such as scrambling, modulation, mapping and the like, then the processed UCI cascaded sequence is transmitted through a determined PUCCH resource.

What described above is the joint processing scheme of two pieces of UCI with different priorities (i.e., the first UCI and the second UCI), and detailed description will be given hereunder to the joint processing scheme of the terminal device when there is a third UCI, where the third UCI has the same priority as that of at least one of the first UCI and the second UCI, or has a different priority from the priority of the first UCI and the priority of the second UCI.

As an optional embodiment, when the first UCI is $A_1$-bit HARQ-ACK and the second UCI is $A_2$-bit HARQ-ACK, the following are further including: if there is also a third uplink channel carrying an SR which overlaps in a time domain with the first uplink channel and/or the second uplink channel, or a transmission time interval between the third uplink channel carrying the SR and the first uplink channel and/or the second uplink channel is less than the second preset threshold, adopting one of the following methods:

Method 1: determining that the SR has a bit number of X bits, cascading the X-bit SR with the first UCI and the second UCI to obtain a second cascaded UCI sequence, and encoding the second cascaded UCI sequence in the second-type encoding scheme; and Method 2: determining that the SR has a bit number of X bits, cascading the X-bit SR with the first UCI and the second UCI to obtain a second cascaded UCI sequence, and when determining that a total number of bits of the second cascaded UCI sequence does not exceed the first preset threshold, encoding the second cascaded UCI sequence in the first-type encoding scheme, or, adding a padding bit or an occupancy bit to the second cascaded UCI sequence till satisfying that a total number of bits of the second cascaded UCI sequence exceeds the first preset threshold, obtaining a padded second cascaded UCI sequence, and encoding the padded second cascaded UCI sequence in the second-type encoding scheme; and when determining that the total number of bits of the second cascaded UCI sequence exceeds the first preset threshold, encoding the second cascaded UCI sequence in the second-type encoding scheme;

where X=ceil(log2(K+1)), ceil( ) is rounding up, and K is a configured number of SRs or a number of SRs meeting the following condition:

the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold.

A process of multiplexing transmission of three pieces of UCI under the joint processing scheme will be described hereunder by taking an example where the first UCI is an $A_1$-bit HP AN, the second UCI is an $A_2$-bit LP AN, the third UCI is an X-bit HP SR and the uplink channel is a PUCCH. The PUCCH carrying the HP AN conflicts with the PUCCH carrying the LP AN, and the PUCCH carrying the HP SR conflicts with the PUCCH carrying the HP AN and/or the PUCCH carrying the LP AN.

Exemplarily, as shown in FIG. 6, when an HP SR overlaps with an AN (HP AN and/or LP AN), the terminal device determines that X takes a value of 1; when $A_1$ takes a value of 1, $A_2$ takes a value of 1 and the first preset threshold is 2 bits, the terminal device cascades the 1-bit HP AN, the 1-bit LP AN and the 1-bit HP SR to obtain a 3-bit second cascaded UCI sequence. Since the bit number of the second cascaded UCI sequence exceeds the first preset threshold, there is no need to add a padding bit or an occupancy bit, and thus the following case is considered where multiplexing transmission is performed by means of encoding:

the terminal device encodes the second cascaded UCI sequence by means of RM encoding, Polar encoding, LDPC encoding, TBCC encoding or Turbo encoding.

For the network device, the processing procedure is similar to the execution steps of the terminal device as described above. The network device can determine that the number of bits of the second cascaded UCI sequence input by the terminal device to the encoder is 3, and then the network device receives, on a determined PUCCH resource, target encoding information obtained from encoding and other processing, and decodes the target encoding information by means of RM encoding, Polar encoding, LDPC encoding, TBCC encoding or Turbo encoding to obtain 3-bit information, and extracts the 1-bit HP AN, the 1-bit LP AN and the 1-bit HP SR, respectively.

The process where multiplexing transmission of some UCI on the same uplink channel is achieved by means of encoding in the joint processing scheme has been described above with specific examples, and detailed description will be given hereunder to a process of multiplexing transmission of UCI in the separate processing scheme.

The process of multiplexing transmission of two pieces of UCI in the separate processing scheme will be described hereunder by taking an example where the first UCI is an $A_1$-bit HP AN, the second UCI is an $A_2$-bit LP AN, and the uplink channel is a PUCCH. The PUCCH carrying the HP AN conflicts with the PUCCH carrying the LP AN.

As an optional embodiment, the following is included: determining, by the terminal device, whether a bit number of the first UCI and a bit number of the second UCI respectively exceeds the first preset threshold; when determining that the bit number of the first UCI does not exceed the first preset threshold, encoding the first UCI in the first-type encoding scheme, or, adding a padding bit or an occupancy bit to the first UCI till satisfying that the bit number of the first UCI exceeds the first preset threshold, obtaining a padded first UCI sequence, and encoding the padded first UCI sequence in the second-type encoding scheme; and/or, when determining that the bit number of the second UCI does not exceed the first preset threshold, encoding the second UCI in the first-type encoding scheme, or, adding a padding bit or an occupancy bit to the second UCI till satisfying that the bit number of the second UCI exceeds the first preset threshold, obtaining a padded second UCI sequence, and encoding the padded second UCI sequence in the second-type encoding scheme.

In the separate processing scheme, the terminal device may encode respectively, in the first-type encoding scheme, UCI of the first UCI and the second UCI for which a bit number does not exceed the first preset threshold, or, the terminal device may add a padding bit or an occupancy bit to the UCI not exceeding the first preset threshold, till the bit number of a UCI sequence to which the bit is added exceeds the first preset threshold, and then encode the bit-padded UCI sequence in the second-type encoding scheme.

As an optional embodiment, the first UCI is $A_4$-bit HARQ-ACK and the second UCI is $A_5$-bit HARQ-ACK, where $A_4$ is equal or unequal to $A_5$, and at least one of $A_4$ and $A_5$ does not exceed the first preset threshold; or the first UCI is $A_6$-bit HARQ-ACK and the second UCI is an SR, where at least one of a bit number of the SR and $A_6$ does not exceed the first preset threshold, the bit number of the SR is X=ceil(log2(K+1)), ceil( ) is rounding up, K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

The process of multiplexing transmission of two pieces of UCI in the separate processing scheme will be described hereunder by taking an example where the first UCI is an $A_4$-bit HP AN, the second UCI is an $A_5$-bit LP AN and the uplink channel is a PUCCH. The PUCCH carrying the HP AN conflicts with the PUCCH carrying the LP AN.

Exemplarily, when $A_4$ takes a value of 1, $A_5$ takes a value of 1, and the first preset threshold is 2 bits, since each of the values of $A_4$ and $A_5$ does not exceed the first preset threshold, the following two cases are considered where multiplexing transmission is performed by means of encoding.

(1) The terminal device performs separate encoding on the 1-bit HP AN and the 1-bit LP AN respectively by means of repetition encoding or RM encoding, and after different processing such as scrambling, modulation, mapping and the like, then transmits the processed HP AN and the processed LP AN through a determined PUCCH resource.

Exemplarily, it is possible to determine a set of PUCCH resources according to the total number of bits (i.e., 2) of the 1-bit HP AN and the 1-bit LP AN, and then determine, according to a PUCCH resource indication field in DCI corresponding to the ANs, a PUCCH resource from the set of PUCCH resources for multiplexing transmission.

(2) The terminal device adds a 2-bit padding bits or occupancy bits to the tails of the 1-bit HP AN and the 1-bit LP AN respectively or any other positions thereof to obtain a new 3-bit HP sequence and a new 3-bit LP sequence, and encodes the new 3-bit HP sequence and the new 3-bit LP sequence respectively by means of RM encoding, Polar encoding, low density parity check (LDPC) encoding, tail biting convolutional (TBCC) encoding or Turbo encoding, and after different processing such as scrambling, modulation, mapping and the like, then transmits the processed new HP sequence and the processed new LP sequence through a determined PUCCH resource.

Exemplarily, it is possible to determine a set of PUCCH resources according to the total number of bits (i.e., 6) of the new 3-bit HP sequence and the new 3-bit LP sequence, and then determine, according to a PUCCH resource indication field in DCI corresponding to the ANs, a PUCCH resource from the set of PUCCH resources for multiplexing transmission.

Likewise, for the network device, it can determine that the terminal device adds a 2-bit padding bits or occupancy bits to the 1-bit HP AN and adds a 2-bit padding bits or occupancy bits to the 1-bit LP AN, thus the network device can determine that each of the new HP sequence and the new LP sequence input by the terminal device to the encoder is 3 bits, and then receives, on a PUCCH resource determined according to 6-bit information (the total number of bits of the new 3-bit HP sequence and the new 3-bit LP sequence), the new HP sequence and the new LP sequence after the encoding and other processing; and the network device extracts, from the received information, information corresponding to the HP AN and information corresponding to the LP AN, and then performs separate decoding on the information corresponding to the HP AN and the information corresponding to the LP AN respectively by means of RM encoding, Polar encoding, LDPC encoding, TBCC encoding or Turbo encoding to obtain 3-bit HP information and 3-bit LP information, and extracts first one bit as the HP AN and the LP AN, respectively.

Exemplarily, when $A_4$ takes a value of 3, $A_5$ takes a value of 2 and the first preset threshold is 2 bits, since the value of $A_4$ exceeds the first preset threshold while the value of $A_5$ does not exceed the first preset threshold, the following case is considered where multiplexing transmission is performed by means of encoding: the terminal device performs separate encoding on the 3-bit HP AN by means of RM encoding, Polar encoding, low density parity check (LDPC) encoding, tail biting convolutional coding (TBCC) encoding or Turbo encoding; adds a 1-bit padding bit or occupancy bit to the tail of the 2-bit LP AN or any other position thereof to obtain a 3-bit padded LP AN sequence, and performs separate encoding on the 3-bit padded LP AN sequence by means of RM encoding, Polar encoding, LDPC encoding, TBCC encoding or Turbo encoding, and after different processing such as scrambling, modulation, mapping and the like, then transmits the processed HP AN sequence and the processed LP AN sequence through a determined PUCCH resource.

In an embodiment of the present application, under the separate encoding scheme, for a UCI sequence exceeding the first preset threshold, the sequence may be encoded directly in the second-type encoding scheme; and for a UCI sequence not exceeding the first preset threshold, bit padding may be performed till the sequence exceeds the first preset threshold, or the UCI sequence not exceeding the first preset threshold is encoded directly in the first-type encoding scheme.

Exemplarily, when $A_4$ takes a value of 3, $A_5$ takes a value of 1 and the first preset threshold is 2 bits, since the value of $A_4$ exceeds the first preset threshold while the value of $A_5$ does not exceed the first preset threshold, the following two cases are considered where multiplexing transmission is performed by means of encoding.

(1) The terminal device performs separate encoding on the 1-bit LP AN by means of repetition encoding or RM encoding, and performs separate encoding on the 3-bit HP AN by means of RM encoding, Polar encoding, LDPC encoding, TBCC encoding or Turbo encoding, and performing after different processing such as scrambling, modulation, mapping and the like on the encoded HP AN and the encoded LP AN respectively, then transmits the processed HP AN and the processed LP AN through a determined PUCCH resource.

Exemplarily, it is possible to determine a set of PUCCH resources according to the total number of bits (i.e., 4) of the 3-bit HP AN and the 1-bit LP AN, and then determine, according to a PUCCH resource indication field in DCI corresponding to the ANs, a PUCCH resource from the set of PUCCH resources for multiplexing transmission.

(2) The terminal device performs separate encoding on the 3-bit HP AN by means of RM encoding, Polar encoding, LDPC encoding, TBCC encoding or Turbo encoding; adds a 2-bit padding bits or occupancy bits to the tail of the 1-bit LP AN or any other position thereof to obtain a new 3-bit LP sequence, and performs separate encoding on the new 3-bit LP sequence by means of RM encoding, Polar encoding, LDPC encoding, TBCC encoding or Turbo encoding; and after different processing such as scrambling, modulation, mapping and the like on the encoded HP sequence and the encoded new LP sequence, then transmits the processed HP AN sequence and the processed new LP sequence through a determined PUCCH resource.

Exemplarily, it is possible to determine a set of PUCCH resources according to the total number of bits (i.e., 6) of the 3-bit HP AN sequence and the new 3-bit LP sequence, and then determine, according to a PUCCH resource indication field in DCI corresponding to the ANs, a PUCCH resource from the set of PUCCH resources for multiplexing transmission.

It should be understood that, in the above-described process of multiplexing transmission of two pieces of UCI under the separate processing scheme, the first UCI may be an HP SR or an LP SR, the second UCI may also be an HP SR or an LP SR, or other different service types, such as CSI, which is not limited in the embodiments of the present application.

The values of $A_1$ and $A_2$ are not limited in the embodiments of the present application. Exemplarily, each of $A_1$ and $A_2$ may take a value of 2, or $A_1$ takes a value of 2 while $A_2$ takes a value of 1, or $A_1$ takes a value of 1 while $A_2$ takes a value of 2, the processing procedure is the same as above, except that: for a 2-bit AN, it is necessary to add a 1-bit padding bit or occupancy bit; and for a 1-bit AN, it is necessary to add a 2-bit padding bits or occupancy bits.

It should be understood that the first preset threshold in the embodiments of the present application may also be any other value, which is not limited herein.

For the network device, the processing procedure is similar to the execution steps of the terminal device as described above. The network device can determine that the terminal device adds a 1-bit padding bit or occupancy bit to the 2-bit HP cascaded sequence and adds a 2-bit padding bits or occupancy bits to the 1-bit LP AN, thus, the network device determines that the bit number of each of the new HP sequence and the new LP sequence input by the terminal device to the encoder is 3, and then can receive, on a determined PUCCH resource, the new HP sequence and the new LP sequence obtained from encoding and other processing; and the network device extracts, from the received information, information corresponding to the new HP sequence and information corresponding to the new LP sequence, and then performs decoding respectively to obtain 3-bit HP information and 3-bit LP information, and extracts first two bits as the HP AN and the HP SR respectively from the 3-bit HP information, and extracts first one bit as the LP AN from the 3-bit LP information.

Exemplarily, as shown in FIG. 4, it is assumed that the first UCI is an $A_6$-bit HP AN and the second UCI is an LP SR, the terminal device determines that the bit number X of the LP SR is 1; and when $A_6$ takes a value of 1 and the first preset threshold is 2 bits, since the value of $A_6$ does not exceed the first preset threshold and the value of X does not exceed the first preset threshold, the following case is considered where multiplexing transmission is performed by means of encoding:

the terminal device adds a 2-bit padding bits or occupancy bits to the tail of the 1-bit HP AN or any other position thereof to obtain a new 3-bit HP AN sequence, and performs separate encoding on the new 3-bit HP AN sequence by means of RM encoding, Polar encoding, LDPC encoding, TBCC encoding or Turbo encoding. The terminal device adds a 2-bit padding bits or occupancy bits to the tail of the 1-bit LP SR or any other position thereof to obtain anew 3-bit LP SR sequence, and performs separate encoding on the new 3-bit LP SR sequence by means of RM encoding, Polar encoding, LDPC encoding, TBCC encoding or Turbo encoding; and after performing different processing such as scrambling, modulation, mapping and the like on the encoded new HP AN sequence and the encoded new LP SR sequence, then the terminal device transmits the processed new HP AN sequence and the processed new LP SR sequence through a determined PUCCH resource.

Exemplarily, in the case as shown in FIG. 5 where there are two LP SRs which overlap with an HP AN, the terminal device determines that the bit number X of the LP SRs is 2; and when $A_6$ takes a value of 1 and the first preset threshold is 2 bits, since the value of $A_6$ does not exceed the first preset threshold and the value of X does not exceed the first preset threshold, the following case is considered where multiplexing transmission is performed by means of encoding:

the terminal device adds a 2-bit padding bits or occupancy bits to the tail of the 1-bit HP AN or any other position thereof to obtain a new 3-bit HP AN sequence, and performs separate encoding on the new 3-bit HP AN sequence by means of RM encoding, Polar encoding, LDPC encoding, TBCC encoding or Turbo encoding. The terminal device adds a 1-bit padding bit or occupancy bit to the tails of the 2-bit LP SRs or any other positions thereof to obtain a new 3-bit LP SR sequence, and performs separate encoding on the new 3-bit LP SR sequence by means of RM encoding, Polar encoding, LDPC encoding, TBCC encoding or Turbo encoding; and after performing different processing such as scrambling, modulation, mapping and the like on the encoded new HP AN sequence and the encoded new LP SR sequence, the terminal device transmits the processed new HP AN sequence and the processed new LP SR sequence through a determined PUCCH resource.

Exemplarily, when the HP AN has a bit number of 1 or 2, and the LP SRs have a bit number exceeding 2 bits (e.g., there are more than 2 LP SRs overlapping with the HP AN), at this point, it is necessary to add 1 bit or 2 bits to the HP AN and then encode the same in the second-type encoding scheme, however, for the LP SRs more than 2 bits, they can be directly encoded in the second-type encoding scheme.

As an optional embodiment, when the first UCI is $A_1$-bit HARQ-ACK and the second UCI is $A_2$-bit HARQ-ACK, if there is also a third uplink channel carrying an SR which overlaps in a time domain with the first uplink channel and/or the second uplink channel, or a transmission time interval between the third uplink channel carrying the SR and the first uplink channel and/or the second uplink channel is less than the second preset threshold, the following is further included:

determining that the SR has a bit number of X bits, and cascading the X-bit SR with first target UCI to obtain a fourth cascaded UCI sequence, where the first target UCI is one of the first UCI and the second UCI; encoding respectively, in the first-type decoding scheme, each individual sequence within the fourth cascaded UCI sequence and second target UCI for which a bit number does not exceed the first preset threshold, or, adding respectively a padding bit or an occupancy bit to each individual sequence till satisfying that a total number of bits exceeds the first preset threshold, and encoding, in the second-type encoding scheme, the sequence to which the padding bit or the occupancy bit is added; and encoding, in the second-type encoding scheme, each individual sequence within the fourth cascaded UCI sequence and the second target UCI for which a bit number exceeds the first preset threshold; where the second target UCI is UCI other than the first target UCI of the first UCI and the second UCI.

In an embodiment of the present application, the first target UCI is UCI having the same priority as that of the X-bit SR.

A process of multiplexing transmission of three pieces of UCI under the separate processing scheme will be described hereunder by taking an example as shown in FIG. 6 where the first UCI is an $A_1$-bit HP AN, the second UCI is an $A_2$-bit LP AN, the third UCI is an X-bit HP SR and the uplink channel is a PUCCH. The PUCCH carrying the HP AN conflicts with the PUCCH carrying the LP AN, and the PUCCH carrying the HP SR conflicts with the PUCCH carrying the HP AN and/or the PUCCH carrying the LP AN. In FIG. 6 (a, b and c), the HP AN, the LP AN and the HP SR may vary or be unaligned in terms of their start positions, whichever cases belong to the present scenario.

Exemplarily, the terminal device determines that X takes a value of 1, and when $A_1$ takes a value of 1, $A_2$ takes a value of 1 and the first preset threshold is 2 bits, the target UCI is an HP AN having the same physical layer priority as that of the HP SR. Since a total number of bits of a cascaded sequence of the HP AN and the HP SR does not exceed the first preset threshold and the bit number of the LP AN does not exceed the first preset threshold, the following two cases are considered where multiplexing transmission is performed by means of encoding.

(1) The terminal device cascades the 1-bit HP AN and the 1-bit HP SR with the same priority to obtain a 2-bit HP cascaded sequence, and performs separate encoding on the HP cascaded sequence and the LP AN respectively by means of repetition encoding or RM encoding, and then transmits the processed HP cascaded sequence and the LP AN through a determined PUCCH resource after different processing such as scrambling, modulation, mapping and the like.

(2) The terminal device cascades the 1-bit HP AN and the 1-bit HP SR with the same priority to obtain a 2-bit HP cascaded sequence, adds a 1-bit padding bit or occupancy bit to the HP cascaded sequence to obtain a new 3-bit HP sequence, and then encodes the new HP sequence by means of RM encoding, Polar encoding, LDPC encoding, TBCC encoding or Turbo encoding; the terminal device adds a 2-bit padding bits or occupancy bits to the 1-bit LP AN to obtain a new 3-bit LP sequence, and then encodes the new LP sequence by means of RM encoding, Polar encoding, LDPC encoding, TBCC encoding or Turbo encoding; and after performing different processing such as scrambling, modulation, mapping and the like on the new HP sequence and the new LP sequence respectively, the terminal device transmits the processed new HP sequence and the processed new LP sequence through a determined PUCCH resource.

Exemplarily, it is possible to determine a PUCCH resource for multiplexing transmission, according to the total number of bits (i.e., 6) of the new 3-bit HP sequence and the new 3-bit LP sequence.

Exemplarily, the terminal device determines that X takes a value of 1, and when $A_1$ takes a value of 2, $A_2$ takes a value of 1 and the first preset threshold is 2 bits, since the total number of bits of the cascaded sequence of the HP AN and the HP SR exceeds the first preset threshold and the bit number of the LP AN does not exceed the first preset threshold, the following case is considered where multiplexing transmission is performed by means of encoding:

the terminal device cascades the 2-bit HP AN and the 1-bit HP SR with the same priority to obtain a 3-bit HP cascaded sequence, and encodes the 3-bit HP cascaded sequence by means of RM encoding, Polar encoding, LDPC encoding, TBCC encoding or Turbo encoding. The terminal device adds a 2-bit padding bits or occupancy bits to the 1-bit LP AN to obtain a new 3-bit LP sequence, and encodes the new LP sequence by means of RM encoding, Polar encoding, LDPC encoding, TBCC encoding or Turbo encoding; and after performing different processing such as scrambling, modulation, mapping and the like on the new HP sequence and the new LP sequence, the terminal device transmits the processed new HP sequence and the processed new LP sequence through a determined PUCCH resource.

Exemplarily, if the third UCI is an LP SR, the LP AN is cascaded with the LP SR and then separate encoding is performed, for other processing procedures, they are the same as those described above, which will not be described here again.

It should be understood that the above-described execution steps of the terminal device and the network device are not in any particular order; in the above-described separate processing scheme for the first UCI, the second UCI and the third UCI, the HP and LP separate encoding processing procedures are not in any particular order.

In the foregoing embodiments, when the uplink channel is a PUSCH, the UCI transmission method provided in the present application is still applicable; in the foregoing embodiments, when HARQ-ACK of different priorities refers to HARQ-ACK for a unicast service and HARQ-ACK for a multicast service, the UCI transmission method provided in the present application is still applicable.

In conjunction with FIG. 1 to FIG. 6, the UCI transmission method according to the embodiments of the present application has been described above in detail; and detailed description will be given hereunder to a UCI transmission apparatus according to an embodiment of the present application in conjunction with FIG. 7 and FIG. 8.

Figure 7:
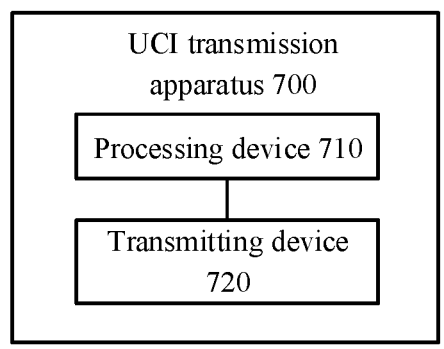
FIG. 7 is a schematic block diagram of a UCI transmission apparatus according to an embodiment of the present application.

FIG. 7 shows a schematic block diagram of a UCI transmission apparatus 700 according to an embodiment of the present application. The UCI transmission apparatus 700 includes a processing device 710 and a transmitting device 720.

The processing device 710 is configured to determine whether a bit number of a UCI sequence exceeds a first preset threshold, where the UCI sequence includes first UCI and second UCI, and a first uplink channel carrying the first UCI and a second uplink channel carrying the second UCI overlap in a time domain or a transmission time interval between the first uplink channel carrying the first UCI and the second uplink channel carrying the second UCI is less than a second preset threshold; the processing device 710 is further configured to: when determining that the bit number of the UCI sequence does not exceed the first preset threshold, encode the UCI sequence in a first-type encoding scheme, or, add a padding bit or an occupancy bit to the UCI sequence till satisfying that a total number of bits exceeds the first preset threshold, obtain a padded UCI sequence, and encode the padded UCI sequence in a second-type encoding scheme; and the transmitting device 720 is configured to transmit an encoded first UCI sequence and an encoded second UCI sequence on a same uplink channel.

In an implementation, the processing device 710 is configured to: cascade the first UCI and the second UCI to obtain a first cascaded UCI sequence; the processing device 710 is further configured to: when determining that a total number of bits of the first cascaded UCI sequence does not exceed the first preset threshold, encode the first cascaded UCI sequence in the first-type encoding scheme, or, add a padding bit or an occupancy bit to the first cascaded UCI sequence till satisfying that the total number of bits of the first cascaded UCI sequence exceeds the first preset threshold, obtain a padded first cascaded UCI sequence, and encode the padded first cascaded UCI sequence in the second-type encoding scheme.

In an implementation, the first UCI is $A_1$-bit HARQ-ACK and the second UCI is $A_2$-bit HARQ-ACK, where $A_1$ is equal or unequal to $A_2$, and $A_1+A_2$ does not exceed the first preset threshold; or the first UCI is $A_3$-bit HARQ-ACK, and the second UCI is an SR, and $A_3$ does not exceed the first preset threshold.

In an implementation, when the first UCI is $A_1$-bit HARQ-ACK and the second UCI is $A_2$-bit HARQ-ACK, the processing device 710 is configured to: if there is also a third uplink channel carrying an SR which overlaps in a time domain with the first uplink channel and/or the second uplink channel, or a transmission time interval between the third uplink channel carrying the SR and the first uplink channel and/or the second uplink channel is less than the second preset threshold, adopt one of the following methods:

Method 1: determining that the SR has a bit number of X bits, cascading the X-bit SR with the first UCI and the second UCI manner to obtain a second cascaded UCI sequence, and encoding the second cascaded UCI sequence in the second-type encoding scheme; and Method 2: determining that the SR has a bit number of X bits, cascading the X-bit SR with the first UCI and the second UCI to obtain a second cascaded UCI sequence, and when determining that a total number of bits of the second cascaded UCI sequence does not exceed the first preset threshold, encoding the second cascaded UCI sequence in the first-type encoding scheme, or, adding a padding bit or an occupancy bit to the second cascaded UCI sequence till satisfying that a total number of bits of the second cascaded UCI sequence exceeds the first preset threshold, obtaining a padded second cascaded UCI sequence, and encoding the padded second cascaded UCI sequence in the second-type encoding scheme; and when determining that the total number of bits of the second cascaded UCI sequence exceeds the first preset threshold, encoding the second cascaded UCI sequence in the second-type encoding scheme;

where X=ceil(log2(K+1)), ceil( ) is rounding up, and K is a configured number of SRs or a number of SRs meeting the following condition: the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold.

In an implementation, when the first UCI is $A_3$-bit HARQ-ACK and the second UCI is an SR, the processing device 710 is configured to perform the following:

Method 1: determining that the SR has a bit number of X bits, cascading the X-bit SR with the first UCI to obtain a third cascaded UCI sequence, and encoding the third cascaded UCI sequence in the second-type encoding scheme; or Method 2: determining that the SR has a bit number of X bits, cascading the X-bit SR with the first UCI to obtain a third cascaded UCI sequence, and when determining that a total number of bits of the third cascaded UCI sequence does not exceed the first preset threshold, encoding the third cascaded UCI sequence in the first-type encoding scheme, or, adding a padding bit or an occupancy bit to the third cascaded UCI sequence till satisfying that a total number of bits of the third cascaded UCI sequence exceeds the first preset threshold, obtaining a padded third cascaded UCI sequence, and encoding the padded third cascaded UCI sequence in the second-type encoding scheme; and when determining that the total number of bits of the third cascaded UCI sequence exceeds a predetermined threshold, encoding the third cascaded UCI sequence in the second-type encoding scheme;

where X=ceil(log2(K+1)), ceil( ) is rounding up, and K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In an implementation, the processing device 710 is configured to: determine whether a bit number of the first UCI and a bit number of the second UCI respectively exceeds the first preset threshold; the processing device 710 is further configured to: when determining that the bit number of the first UCI does not exceed the first preset threshold, encode the first UCI in the first-type encoding scheme, or, add a padding bit or an occupancy bit to the first UCI till satisfying that the bit number of the first UCI exceeds the first preset threshold, obtain a padded first UCI sequence, and encode the padded first UCI sequence in the second-type encoding scheme; and/or, when determining that the bit number of the second UCI does not exceed the first preset threshold, encode the second UCI in the first-type encoding scheme, or, add a padding bit or an occupancy bit to the second UCI till satisfying that the bit number of the second UCI exceeds the first preset threshold, obtain a padded second UCI sequence, and encode the padded second UCI sequence in the second-type encoding scheme.

In an implementation, the first UCI is $A_4$-bit HARQ-ACK and the second UCI is $A_5$-bit HARQ-ACK, where $A_4$ is equal or unequal to $A_5$, and at least one of $A_4$ and $A_5$ does not exceed the first preset threshold; or the first UCI is $A_6$-bit HARQ-ACK and the second UCI is an SR, where at least one of a bit number of the SR and $A_6$ does not exceed the first preset threshold, the bit number of the SR is X=ceil (log2(K+1)), ceil( ) is rounding up, K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In an implementation, when the first UCI is $A_4$-bit HARQ-ACK and the second UCI is $A_5$-bit HARQ-ACK, if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, the processing device 710 is configured to:

determine that the SR has a bit number of X bits, and cascade the X-bit SR with first target UCI to obtain a fourth cascaded UCI sequence, where the first target UCI is one of the first UCI and the second UCI; encode respectively, in the first-type decoding scheme, each individual sequence within the fourth cascaded UCI sequence and second target UCI for which a bit number does not exceed the first preset threshold, or, add respectively a padding bit or an occupancy bit to each individual sequence till satisfying that a total number of bits exceeds the first preset threshold, and encode, in the second-type encoding scheme, the sequence to which the padding bit or the occupancy bit is added; and encode, in the second-type encoding scheme, each individual sequence within the fourth cascaded UCI sequence and the second target UCI for which a bit number exceeds the first preset threshold where the second target UCI is UCI other than the first target UCI of the first UCI and the second UCI.

In an implementation, the processing device 710 is configured to: when a padding bit or an occupancy bit is added, determine, according to a bit number of a sequence to which the padding bit or the occupancy bit is added, a PUCCH resource carrying the encoded first UCI sequence and the encoded second UCI sequence.

In an implementation, the first-type encoding scheme is repetition encoding or RM encoding, and the second-type encoding scheme is RM encoding, Polar encoding, LDPC encoding, TBCC encoding or Turbo encoding.

In an implementation, the first UCI and the second UCI is UCI of a same physical layer priority or different physical layer priorities; or the first UCI and the second UCI is respectively one piece of UCI between UCI corresponding to a unicast service and UCI corresponding to a multicast service.

In one embodiment, the UCI transmission apparatus 700 may be the terminal device in the foregoing embodiments, or the functions of the application of the terminal device in the foregoing embodiments may be integrated in the UCI transmission apparatus 700. The above-mentioned functions can be implemented by hardware or thorough the hardware executing corresponding software. The hardware or software includes one or more devices corresponding to the above-mentioned functions. For example, the above-described transmitting device 720 may be a communication interface, such as a transceiver interface. The UCI transmission apparatus 700 can be used to execute each process and/or step in the foregoing method embodiments that corresponds to the application of the terminal device.

Figure 8:
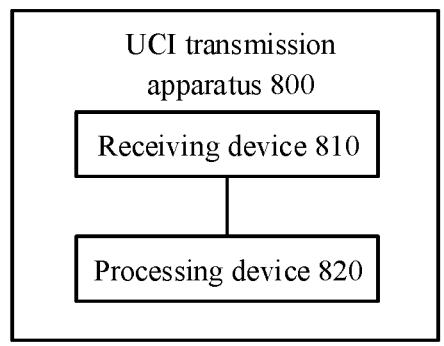
FIG. 8 is a schematic block diagram of another UCI transmission apparatus according to an embodiment of the present application.

FIG. 8 shows a schematic block diagram of another UCI transmission apparatus 800 according to an embodiment of the present application. The UCI transmission apparatus 800 includes a receiving device 810 and a processing device 820.

The receiving device 810 is configured to receive an encoded first UCI sequence and an encoded second UCI sequence on a same uplink channel; and the processing device 820 is configured to determine whether a bit number of a UCI sequence exceeds a first preset threshold, where the UCI sequence includes first UCI and second UCI, and a first uplink channel carrying the first UCI and a second uplink channel carrying the second UCI overlap in a time domain or a transmission time interval between the first uplink channel carrying the first UCI and the second uplink channel carrying the second UCI is less than a second preset threshold; and the processing device 820 is further configured to: when determining that the bit number of the UCI sequence does not exceed the first preset threshold, decode the UCI sequence in a first-type decoding scheme, or, determine that a padding bit or an occupancy bit is added to the UCI sequence till satisfying that a total number of bits exceeds the first preset predetermined threshold, and decode, in a second-type decoding scheme, the sequence to which the padding bit or the occupancy bit is added.

In an implementation, the processing device 820 is configured to: determine that the terminal device cascades the first UCI and the second UCI to obtain a first cascaded UCI sequence; when determining that a total number of bits of the first cascaded UCI sequence does not exceed the first preset threshold, decode the first cascaded UCI sequence in the first-type decoding scheme, or, determine that a padding bit or an occupancy bit is added to the first cascaded UCI sequence by the terminal device till satisfying that the total number of bits of the first cascaded UCI sequence exceeds the first preset threshold, obtain a padded first cascaded UCI sequence, and decode, in the second-type decoding scheme, the sequence to which the padding bit or the occupancy bit is added.

In an implementation, the first UCI is $A_1$-bit HARQ-ACK and the second UCI is $A_2$-bit HARQ-ACK, where $A_1$ is equal or unequal to $A_2$, and $A_1+A_2$ does not exceed the first preset threshold; or the first UCI is $A_3$-bit HARQ-ACK, and the second UCI is an SR, and $A_3$ does not exceed the first preset threshold.

In an implementation, when the first UCI is $A_1$-bit HARQ-ACK and the second UCI is $A_2$-bit HARQ-ACK, the processing device 820 is configured to: if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, adopt one of the following methods:

Method 1: determining that the terminal device cascades an X-bit SR with the first UCI and the second UCI to obtain a second cascaded UCI sequence, and decoding the second cascaded UCI sequence in the second-type decoding scheme; and Method 2: determining that the terminal device cascades an X-bit SR with the first UCI and the second UCI to obtain a second cascaded UCI sequence, and when determining that a total number of bits of the second cascaded UCI sequence does not exceed the first preset threshold, decoding the second cascaded UCI sequence in the first-type decoding scheme, or, determining that a padding bit or an occupancy bit is added to the second cascaded UCI sequence by the terminal device till satisfying that a total number of bits of the second cascaded UCI sequence exceeds the first preset threshold, obtaining a padded second cascaded UCI sequence, and decoding the padded second cascaded UCI sequence in the second-type decoding scheme; and when determining that the total number of bits of the second cascaded UCI sequence exceeds the first preset threshold, decoding the second cascaded UCI sequence in the second-type decoding scheme;

where $X=\text{ceil}(\log2(K+1))$, ceil( ) is rounding up, and K is a configured number of SRs or a number of SRs meeting the following condition: the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold.

In an implementation, when the first UCI is $A_3$-bit HARQ-ACK and the second UCI is an SR, the processing device 820 is configured to perform the following:

Method 1: determining that the terminal device cascades an X-bit SR with the first UCI to obtain a third cascaded UCI sequence, and decoding the third cascaded UCI sequence in the second-type decoding scheme; or Method 2: determining that the terminal device cascades an X-bit SR with the first UCI to obtain a third cascaded UCI sequence, and when determining that a total number of bits of the third cascaded UCI sequence does not exceed the first preset threshold, decoding the third cascaded UCI sequence in the first-type decoding scheme, or, determining that a padding bit or an occupancy bit is added to the third cascaded UCI sequence by the terminal device till satisfying that a total number of bits of the third cascaded UCI sequence exceeds the first preset threshold, obtaining a padded third cascaded UCI sequence, and decoding the padded third cascaded UCI sequence in the second-type decoding scheme; and when determining that the total number of bits of the third cascaded UCI sequence exceeds a predetermined threshold, decoding the third cascaded UCI sequence in the second-type decoding scheme;

where $X=\text{ceil}(\log2(K+1))$, ceil( ) is rounding up, and K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In an implementation, the processing device 820 is configured to: determine whether a bit number of the first UCI and a bit number of the second UCI respectively exceeds the first preset threshold; when determining that the bit number of the first UCI does not exceed the first preset threshold, decode the first UCI in the first-type decoding scheme, or, determine that a padding bit or an occupancy bit is added to the first UCI by the terminal device till satisfying that the bit number of the first UCI exceeds the first preset threshold, and decode the padded first UCI sequence in the second-type decoding scheme when a padded first UCI sequence is obtained; and/or, when determining that the bit number of the second UCI does not exceed the first preset threshold, decode the second UCI in the first-type decoding scheme, or, determine that a padding bit or an occupancy bit is added to the second UCI by the terminal device till satisfying that the bit number of the second UCI exceeds the first preset threshold, obtain a padded second UCI sequence, and decode the padded second UCI sequence in the second-type decoding scheme.

In an implementation, the first UCI is $A_4$-bit HARQ-ACK and the second UCI is $A_5$-bit HARQ-ACK, where $A_4$ is equal or unequal to $A_5$, and at least one of $A_4$ and $A_5$ does not exceed the first preset threshold; or the first UCI is $A_6$-bit HARQ-ACK and the second UCI is an SR, where at least one of a bit number of the SR and $A_6$ does not exceed the first preset threshold, the bit number of the SR is X=ceil(log2(K+1)), ceil( ) is rounding up, K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In an implementation, when the first UCI is $A_1$-bit HARQ-ACK and the second UCI is $A_2$-bit HARQ-ACK, if there is also a third uplink channel carrying an SR which overlaps in a time domain with the first uplink channel and/or the second uplink channel, or a transmission time interval between the third uplink channel carrying the SR and the first uplink channel and/or the second uplink channel is less than the second preset threshold, the processing device 820 is configured to:

determine that the terminal device cascades an X-bit SR with first target UCI to obtain a fourth cascaded UCI sequence, where the first target UCI is one of the first UCI and the second UCI; decode, respectively, in the first-type decoding scheme, each individual sequence within the fourth cascaded UCI sequence and second target UCI for which a bit number does not exceed the first preset threshold, or, determine that a padding bit or an occupancy bit is added to each individual sequence by the terminal device till satisfying that a total number of bits exceeds the first preset threshold, and decode, in the second-type decoding scheme, the sequence to which the padding bit or the occupancy bit is added; and decode, in the second-type decoding scheme, each individual sequence within the fourth cascaded UCI sequence and the second target UCI for which a bit number exceeds the first preset threshold; where the second target UCI is UCI other than the first target UCI of the first UCI and the second UCI.

In an implementation, the processing device 820 is configured to: when determining that a padding bit or an occupancy bit is added to a UCI sequence by the terminal device, determine, according to a bit number of the sequence to which the padding bit or the occupancy bit is added, a PUCCH resource for receiving the encoded first UCI sequence and the encoded second UCI sequence.

In an implementation, the first-type decoding scheme is repetition decoding or RM decoding, and the second-type decoding scheme is RM decoding, Polar decoding, LDPC decoding, TBCC decoding or Turbo decoding.

In an implementation, the first UCI and the second UCI is UCI of a same physical layer priority or different physical layer priorities; or the first UCI and the second UCI is respectively one piece of UCI between UCI corresponding to a unicast service and UCI corresponding to a multicast service.

Figure 9:
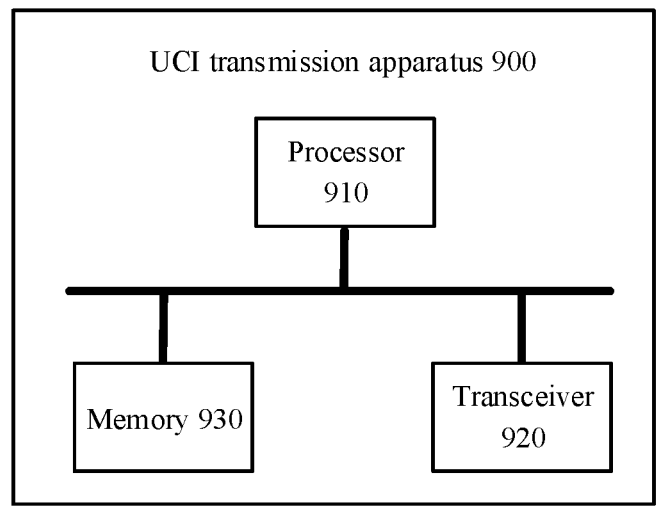
FIG. 9 is a schematic block diagram of yet another UCI transmission apparatus according to an embodiment of the present application.

FIG. 9 shows a schematic block diagram of yet another UCI transmission apparatus 900 according to an embodiment of the present application. The UCI transmission apparatus 900 includes a processor 910, a transceiver 920 and a memory 930. Among them, the processor 910, the transceiver 920 the memory 930 communicate with each other via an internal connection path, the memory 930 is configured to store an instruction, the processor 910 is configured to execute the instruction stored in the memory 930 to control the transceiver 920 to transmit a signal and/or receive a signal.

It should be understood that the UCI transmission apparatus 900 may be the terminal device in the foregoing embodiments, or, the functions of the terminal device in the foregoing embodiments may be integrated in the UCI transmission apparatus 900. The UCI transmission apparatus 900 may be configured to execute each step and/or process in the foregoing method embodiments that corresponds to the terminal device. In an implementation, the memory 930 may include a read-only memory and a random access memory, and provide an instruction and data to the processor. Part of the memory may also include a non-volatile random access memory. For example, the memory can also store device type information. The processor 910 may be configured to execute the instruction stored in the memory; and when the processor executes the instruction, the processor can execute each step and/or process in the foregoing method embodiments that corresponds to the terminal device.

It should be understood that, in an embodiment of the present application, the processor 910 may be a central processing unit (CPU), and the processor may also be other general-purpose processor, a digital signal processor (DSP), an application-specific integrated circuit (ASIC), a field-programmable gate array (FPGA), or other programmable logic device, a discrete gate or a transistor logic device, a discrete hardware component, etc. The general-purpose processor can be a microprocessor, or the processor can be any conventional processor, etc.

The processor 910 configured to determine whether a bit number of a UCI sequence exceeds a first preset threshold, where the UCI sequence includes first UCI and second UCI, and a first uplink channel carrying the first UCI and a second uplink channel carrying the second UCI overlap in a time domain or a transmission time interval between the first uplink channel carrying the first UCI and the second uplink channel carrying the second UCI is less than a second preset threshold; the processor 910 is further configured to: when determining that the bit number of the UCI sequence does not exceed the first preset threshold, encode the UCI sequence in a first-type encoding scheme, or, add a padding bit or an occupancy bit to the UCI sequence till satisfying that a total number of bits exceeds the first preset threshold, obtain a padded UCI sequence, and encode the padded UCI sequence in a second-type encoding scheme; and the transceiver 920 is configured to transmit an encoded first UCI sequence and an encoded second UCI sequence on a same uplink channel.

In an implementation, the processor 910 is configured to: cascade the first UCI and the second UCI to obtain a first cascaded UCI sequence; the processor 910 is further configured to: when determining that a total number of bits of the first cascaded UCI sequence does not exceed the first preset threshold, encode the first cascaded UCI sequence in the first-type encoding scheme, or, add a padding bit or an occupancy bit to the first cascaded UCI sequence till satisfying that the total number of bits of the first cascaded UCI sequence exceeds the first preset threshold, obtain a padded first cascaded UCI sequence, and encode the padded first cascaded UCI sequence in the second-type encoding scheme.

In an implementation, the first UCI is $A_1$-bit HARQ-ACK and the second UCI is $A_2$-bit HARQ-ACK, where $A_1$ is equal or unequal to $A_2$, and $A_1+A_2$ does not exceed the first preset threshold; or the first UCI is $A_3$-bit HARQ-ACK, and the second UCI is an SR, and $A_3$ does not exceed the first preset threshold.

In an implementation, when the first UCI is $A_1$-bit HARQ-ACK and the second UCI is $A_2$-bit HARQ-ACK, the processor 910 is configured to: if there is also a third uplink channel carrying an SR which overlaps in a time domain with the first uplink channel and/or the second uplink channel, or a transmission time interval between the third uplink channel carrying the SR and the first uplink channel and/or the second uplink channel is less than the second preset threshold, adopt one of the following methods:

Method 1: determining that the SR has a bit number of X bits, cascading the X-bit SR with the first UCI and the second UCI to obtain a second cascaded UCI sequence, and encoding the second cascaded UCI sequence in the second-type encoding scheme; and Method 2: determining that the SR has a bit number of X bits, cascading the X-bit SR with the first UCI and the second UCI to obtain a second cascaded UCI sequence, and when determining that a total number of bits of the second cascaded UCI sequence does not exceed the first preset threshold, encoding the second cascaded UCI sequence in the first-type encoding scheme, or, adding a padding bit or an occupancy bit to the second cascaded UCI sequence till satisfying that a total number of bits of the second cascaded UCI sequence exceeds the first preset threshold, obtaining a padded second cascaded UCI sequence, and encoding the padded second cascaded UCI sequence in the second-type encoding scheme; and when determining that the total number of bits of the second cascaded UCI sequence exceeds the first preset threshold, encoding the second cascaded UCI sequence in the second-type encoding scheme;

where $X=\text{ceil}(\log2(K+1))$, ceil( ) is rounding up, and K is a configured number of SRs or a number of SRs meeting the following condition: the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold.

In an implementation, when the first UCI is $A_3$-bit HARQ-ACK and the second UCI is an SR, the processor 910 is configured to perform the following:

Method 1: determining that the SR has a bit number of X bits, cascading the X-bit SR with the first UCI to obtain a third cascaded UCI sequence, and encoding the third cascaded UCI sequence in the second-type encoding scheme; or Method 2: determining that the SR has a bit number of X bits, cascading the X-bit SR with the first UCI to obtain a third cascaded UCI sequence, and when determining that a total number of bits of the third cascaded UCI sequence does not exceed the first preset threshold, encoding the third cascaded UCI sequence in the first-type encoding scheme, or, adding a padding bit or an occupancy bit to the third cascaded UCI sequence till satisfying that a total number of bits of the third cascaded UCI sequence exceeds the first preset threshold, obtaining a padded third cascaded UCI sequence, and encoding the padded third cascaded UCI sequence in the second-type encoding scheme; and when determining that the total number of bits of the third cascaded UCI sequence exceeds a predetermined threshold, encoding the third cascaded UCI sequence in the second-type encoding scheme;

where $X=\text{ceil}(\log2(K+1))$, ceil( ) is rounding up, and K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In an implementation, the processor 910 is configured to: determine whether a bit number of the first UCI and a bit number of the second UCI respectively exceeds the first preset threshold; the processor 910 is further configured to: when determining that the bit number of the first UCI does not exceed the first preset threshold, encode the first UCI in the first-type encoding scheme, or, add a padding bit or an occupancy bit to the first UCI till satisfying that the bit number of the first UCI exceeds the first preset threshold, obtain a padded first UCI sequence, and encode the padded first UCI sequence in the second-type encoding scheme; and/or, when determining that the bit number of the second UCI does not exceed the first preset threshold, encode the second UCI in the first-type encoding scheme, or, add a padding bit or an occupancy bit to the second UCI till satisfying that the bit number of the second UCI exceeds the first preset threshold, obtain a padded second UCI sequence, and encode the padded second UCI sequence in the second-type encoding scheme.

In an implementation, the first UCI is $A_4$-bit HARQ-ACK and the second UCI is $A_5$-bit HARQ-ACK, where $A_4$ is equal or unequal to $A_5$, and at least one of $A_4$ and $A_5$ does not exceed the first preset threshold; or the first UCI is $A_6$-bit HARQ-ACK and the second UCI is an SR, where at least one of a bit number of the SR and $A_6$ does not exceed the first preset threshold, the bit number of the SR is $X=\text{ceil}(\log2(K+1))$, ceil( ) is rounding up, K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In an implementation, when the first UCI is $A_1$-bit HARQ-ACK and the second UCI is $A_2$-bit HARQ-ACK, if there is also a third uplink channel carrying an SR which overlaps in a time domain with the first uplink channel and/or the second uplink channel, or a transmission time interval between the third uplink channel carrying the SR and the first uplink channel and/or the second uplink channel is less than the second preset threshold, the processor 910 is configured to:

determine that the SR has a bit number of X bits, and cascade the X-bit SR with first target UCI to obtain a fourth cascaded UCI sequence, where the first target UCI is one of the first UCI and the second UCI; encode, respectively in the first-type encoding scheme, each individual sequence within the fourth cascaded UCI sequence and second target UCI for which a bit number does not exceed the first preset threshold, or, add a padding bit or an occupancy bit to each individual sequence till satisfying that a total number of bits exceeds the first preset threshold, and encode, in the second-type encoding scheme, the sequence to which the padding bit or the occupancy bit is added; and encode, in the second-type encoding scheme, each individual sequence within the fourth cascaded UCI sequence and the second target UCI for which a bit number exceeds the first preset threshold; where the second target UCI is UCI other than the first target UCI of the first UCI and the second UCI.

In an implementation, the processor 910 is configured to: when a padding bit or an occupancy bit is added, determine, according to a bit number of a sequence to which the padding bit or the occupancy bit is added, a PUCCH resource carrying the encoded first UCI sequence and the encoded second UCI sequence.

In an implementation, the first-type encoding scheme is repetition encoding or RM encoding, and the second-type encoding scheme is RM encoding, Polar encoding, LDPC encoding, TBCC encoding or Turbo encoding.

In an implementation, the first UCI and the second UCI is UCI of a same physical layer priority or different physical layer priorities; or the first UCI and the second UCI is respectively one piece of UCI between UCI corresponding to a unicast service and UCI corresponding to a multicast service.

Figure 10:
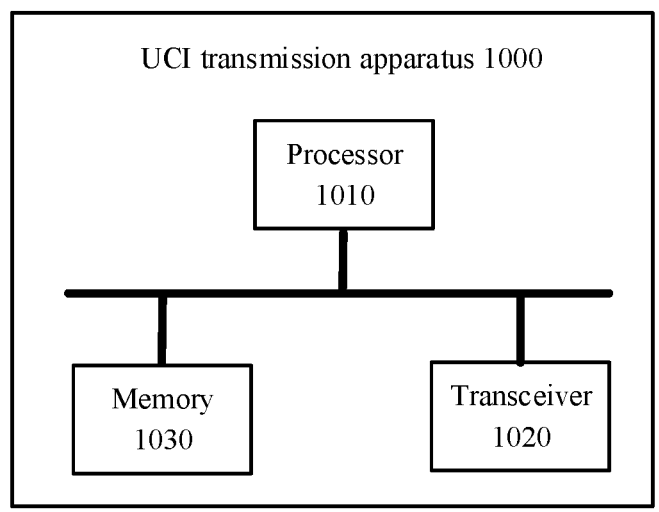
FIG. 10 is a schematic block diagram of yet still another UCI transmission apparatus according to an embodiment of the present application.

FIG. 10 shows a schematic block diagram of yet another UCI transmission apparatus 1000 according to an embodiment of the present application. The UCI transmission apparatus 1000 includes a processor 1010, a transceiver 1020 and a memory 1030. Among them, the processor 1010, the transceiver 1020 the memory 1030 communicate with each other via an internal connection path, the memory 1030 is configured to store an instruction, the processor 1010 is configured to execute the instruction stored in the memory 1030 to control the transceiver 1020 to transmit a signal and/or receive a signal.

It should be understood that the UCI transmission apparatus 1000 may be the network device in the foregoing embodiments, or, the functions of the network device in the foregoing embodiments may be integrated in the UCI transmission apparatus 1000. The UCI transmission apparatus 1000 may be configured to execute each step and/or process in the foregoing method embodiments that corresponds to the network device. For specific functions of each part, detailed description has been given above based on FIG. 9, which will not be described here again.

The transceiver 1020 is configured to receive an encoded first UCI sequence and an encoded second UCI sequence on a same uplink channel; and the processor 1010 is configured to determine whether a bit number of a UCI sequence exceeds a first preset threshold, where the UCI sequence includes first UCI and second UCI, and a first uplink channel carrying the first UCI and a second uplink channel carrying the second UCI overlap in a time domain or a transmission time interval between the first uplink channel carrying the first UCI and the second uplink channel carrying the second UCI is less than a second preset threshold; and the processor 1010 is further configured to: when determining that the bit number of the UCI sequence does not exceed the first preset threshold, decode the UCI sequence in a first-type decoding scheme, or, determine that a padding bit or an occupancy bit is added to the UCI sequence till satisfying that a total number of bits exceeds the first preset predetermined threshold, and decode, in a second-type decoding scheme, the sequence to which the padding bit or the occupancy bit is added.

In an implementation, the processor 1010 is configured to: determine that the terminal device cascades the first UCI and the second UCI to obtain a first cascaded UCI sequence; when determining that a total number of bits of the first cascaded UCI sequence does not exceed the first preset threshold, decode the first cascaded UCI sequence in the first-type decoding scheme, or, determine that a padding bit or an occupancy bit is added to the first cascaded UCI sequence by the terminal device till satisfying that the total number of bits of the first cascaded UCI sequence exceeds the first preset threshold, obtain a padded first cascaded UCI sequence, and decode, in the second-type decoding scheme, the sequence to which the padding bit or the occupancy bit is added.

In an implementation, the first UCI is $A_1$-bit HARQ-ACK and the second UCI is $A_2$-bit HARQ-ACK, where $A_1$ is equal or unequal to $A_2$, and $A_1+A_2$ does not exceed the first preset threshold; or the first UCI is $A_3$-bit HARQ-ACK, and the second UCI is an SR, and $A_3$ does not exceed the first preset threshold.

In an implementation, when the first UCI is $A_1$-bit HARQ-ACK and the second UCI is $A_2$-bit HARQ-ACK, the processor 1010 is configured to: if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, adopt one of the following methods:

Method 1: determining that the terminal device cascades an X-bit SR with the first UCI and the second UCI to obtain a second cascaded UCI sequence, and decoding the second cascaded UCI sequence in the second-type decoding scheme; and Method 2: determining that the terminal device cascades an X-bit SR with the first UCI and the second UCI to obtain a second cascaded UCI sequence, and when determining that a total number of bits of the second cascaded UCI sequence does not exceed the first preset threshold, decoding the second cascaded UCI sequence in the first-type decoding scheme, or, determining that a padding bit or an occupancy bit is added to the second cascaded UCI sequence by the terminal device till satisfying that a total number of bits of the second cascaded UCI sequence exceeds the first preset threshold, obtaining a padded second cascaded UCI sequence, and decoding the padded second cascaded UCI sequence in the second-type decoding scheme; and when determining that the total number of bits of the second cascaded UCI sequence exceeds the first preset threshold, decoding the second cascaded UCI sequence in the second-type decoding scheme;

where X=ceil(log2(K+1)), ceil( ) is rounding up, and K is a configured number of SRs or a number of SRs meeting the following condition: the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold.

In an implementation, when the first UCI is $A_3$-bit HARQ-ACK and the second UCI is an SR, the processor 1010 is to perform the following:

Method 1: determining that the terminal device cascades an X-bit SR with the first UCI to obtain a third cascaded UCI sequence, and decoding the third cascaded UCI sequence in the second-type decoding scheme; or Method 2: determining that the terminal device cascades an X-bit SR with the first UCI to obtain a third cascaded UCI sequence, and when determining that a total number of bits of the third cascaded UCI sequence does not exceed the first preset threshold, decoding the third cascaded UCI sequence in the first-type decoding scheme, or, determining that a padding bit or an occupancy bit is added to the third cascaded UCI sequence by the terminal device till satisfying that a total number of bits of the third cascaded UCI sequence exceeds the first preset threshold, obtaining a padded third cascaded UCI sequence, and decoding the padded third cascaded UCI sequence in the second-type decoding scheme; and when determining that the total number of bits of the third cascaded UCI sequence exceeds a predetermined threshold, decoding the third cascaded UCI sequence in the second-type decoding scheme;

where X=ceil(log2(K+1)), ceil( ) is rounding up, and K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In an implementation, the processor 1010 is configured to: determine whether a bit number of the first UCI and a bit number of the second UCI respectively exceeds the first preset threshold; when determining that the bit number of the first UCI does not exceed the first preset threshold, decode the first UCI in the first-type decoding scheme, or, determine that a padding bit or an occupancy bit is added to the first UCI by the terminal device till satisfying that the bit number of the first UCI exceeds the first preset threshold, and decode the padded first UCI sequence in the second-type decoding scheme when a padded first UCI sequence is obtained; and/or, when determining that the bit number of the second UCI does not exceed the first preset threshold, decode the second UCI in the first-type decoding scheme, or, determine that a padding bit or an occupancy bit is added to the second UCI by the terminal device till satisfying that the bit number of the second UCI exceeds the first preset threshold, obtain a padded second UCI sequence, and decode the padded second UCI sequence in the second-type decoding scheme.

In an implementation, the first UCI is $A_4$-bit HARQ-ACK and the second UCI is $A_5$-bit HARQ-ACK, where $A_4$ is equal or unequal to $A_5$, and at least one of $A_4$ and $A_5$ does not exceed the first preset threshold; or the first UCI is $A_6$-bit HARQ-ACK and the second UCI is an SR, where at least one of a bit number of the SR and $A_6$ does not exceed the first preset threshold, the bit number of the SR is X=ceil (log2(K+1)), ceil( ) is rounding up, K is a configured number of SRs or a number of SRs meeting the following condition: the second uplink channel carrying the SR overlaps in a time domain with the first uplink channel, or a transmission time interval between the first uplink channel and the second uplink channel carrying the SR is less than the second preset threshold.

In an implementation, when the first UCI is $A_1$-bit HARQ-ACK and the second UCI is $A_2$-bit HARQ-ACK, if there is also a third uplink channel carrying an SR which overlaps in a time domain with the first uplink channel and/or the second uplink channel, or a transmission time interval between the third uplink channel carrying the SR and the first uplink channel and/or the second uplink channel is less than the second preset threshold, the processor 1010 is configured to:

determine that the terminal device cascades an X-bit SR with first target UCI to obtain a fourth cascaded UCI sequence, where the first target UCI is one of the first UCI and the second UCI; decode, respectively in the first-type decoding scheme, each individual sequence within the fourth cascaded UCI sequence and second target UCI for which a bit number does not exceed the first preset threshold, or, determine that a padding bit or an occupancy bit is added to each individual sequence by the terminal device till satisfying that a total number of bits exceeds the first preset threshold, and decode, in the second-type decoding scheme, the sequence to which the padding bit or the occupancy bit is added; and decode, in the second-type decoding scheme, each individual sequence within the fourth cascaded UCI sequence and the second target UCI for which a bit number exceeds the first preset threshold; where the second target UCI is UCI other than the first target UCI of the first UCI and the second UCI.

In an implementation, the processor 1010 is configured to: when determining that a padding bit or an occupancy bit is added to a UCI sequence by the terminal device, determine, according to a bit number of the sequence to which the padding bit or the occupancy bit is added, a PUCCH resource for receiving the encoded first UCI sequence and the encoded second UCI sequence.

In an implementation, the first-type decoding scheme is repetition decoding or RM decoding, and the second-type decoding scheme is RM decoding, Polar decoding, LDPC decoding, TBCC decoding or Turbo decoding.

In an implementation, the first UCI and the second UCI is UCI of a same physical layer priority or different physical layer priorities; or the first UCI and the second UCI is respectively one piece of UCI between UCI corresponding to a unicast service and UCI corresponding to a multicast service.

During implementation, each step of the above-described method may be completed by an integrated logic circuit in the form of hardware and/or instructions in the form of software in the processor, the steps of the method disclosed in conjunction with the embodiments of the present application may be directly embodied as being performed and completed by a hardware processor, or may be performed and completed by a combination of hardware and software modules in the processor. The software module may be located in a storage medium mature in the art, such as a random access memory, a flash memory, a read only memory, a programmable read only memory, an electrically erasable programmable memory, a register, or the like. The storage medium is located in the memory. The processor executes the instruction(s) in the memory and completes the steps in the above-described method in conjunction with its hardware. For the sake of redundancy, detailed description will not be given here again.

The modules and the algorithm steps of each example that are described with reference to the embodiments disclosed herein may be implemented by electronic hardware or a combination of electronic hardware and computer software. The situation whether these functions are performed by hardware or software depends on specific applications and design constraints of the embodiments. The described functions by using different methods for respective specific applications, and such implementation should not be regarded as going beyond the scope of the present application.

For the purpose of convenient and brief description, reference may be made to the corresponding process in the foregoing method embodiments for detailed working processes of the foregoing systems, apparatuses, and modules, and details will not be described herein again.

In several embodiments provided in the present application, it should be understood that the disclosed systems, apparatuses, and methods may be implemented in other manners. For example, the described apparatus embodiments are merely exemplary. For instance, the division of the modules is merely a division of logical functions and there may be other divisions during actual implementations. For instance, multiple modules or components may be combined or integrated into another system, or some features may be omitted or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, that is, may be located in one position, or may be distributed on multiple network modules. A part or all of the modules may be selected according to actual needs to achieve the objections of the scheme in the embodiments.

In addition, functional modules in the embodiments of the present application may be integrated into one processing module, or each of the modules may exist alone physically, or two or more modules are integrated into one module.

If implemented in a form of a software functional module and sold or used as an independent product, the functions may be stored in a computer-readable storage medium. Based on such understanding, the embodiments of the present application essentially, or the part contributing to the prior art, or a part of the embodiments may be implemented in a form of a software product. The computer software product is stored in a storage medium, and includes several instructions for enabling a computer device (which may be a personal computer, a server, or a network device, etc.) to perform all or a part of the steps of the method(s) described in the embodiments of the present application. The foregoing storage medium includes: a medium capable of storing program codes, such as a USB flash disk, a mobile hard disk, a read-only memory (ROM), a random access memory (RAM), a magnetic disk, or an optical disc, etc.

The invention claimed is:

1. An uplink control information (UCI) transmission method, comprising:
   determining, by a terminal device, whether a bit number of a UCI sequence exceeds a first preset threshold, wherein the UCI sequence comprises first UCI and second UCI, and a first uplink channel carrying the first UCI and a second uplink channel carrying the second UCI overlap in a time domain or a transmission time interval between the first uplink channel carrying the first UCI and the second uplink channel carrying the second UCI is less than a second preset threshold;
   when determining that the bit number of the UCI sequence does not exceed the first preset threshold, encoding the UCI sequence in a first-type encoding scheme, or, adding a padding bit or an occupancy bit to the UCI sequence till satisfying that a total number of bits exceeds the first preset threshold, obtaining a padded UCI sequence, and encoding the padded UCI sequence in a second-type encoding scheme;
   transmitting an encoded first UCI sequence and an encoded second UCI sequence on a same uplink channel.

2. The method according to claim 1, further comprising:
   Method I: cascading, by the terminal device, the first UCI and the second UCI to obtain a first cascaded UCI sequence;
   when determining that a total number of bits of the first cascaded UCI sequence does not exceed the first preset threshold,
   encoding the first cascaded UCI sequence in the first-type encoding scheme, or,
   adding a padding bit or an occupancy bit to the first cascaded UCI sequence till satisfying that the total number of bits of the first cascaded UCI sequence exceeds the first preset threshold, obtaining a padded first cascaded UCI sequence, and encoding the padded first cascaded UCI sequence in the second-type encoding scheme; or
   Method II: determining, by the terminal device, whether a bit number of the first UCI and a bit number of the second UCI respectively exceeds the first preset threshold;
   when determining that the bit number of the first UCI does not exceed the first preset threshold, encoding the first UCI in the first-type encoding scheme, or, adding a padding bit or an occupancy bit to the first UCI till satisfying that the bit number of the first UCI exceeds the first preset threshold, obtaining a padded first UCI sequence, and encoding the padded first UCI sequence in the second-type encoding scheme; and/or,
   when determining that the bit number of the second UCI does not exceed the first preset threshold, encoding the second UCI in the first-type encoding scheme, or, adding a padding bit or an occupancy bit to the second UCI till satisfying that the bit number of the second UCI exceeds the first preset threshold, obtaining a padded second UCI sequence, and encoding the padded second UCI sequence in the second-type encoding scheme.

3. The method according to claim 2, wherein in Method I, the first UCI is A1-bit HARQ-ACK and the second UCI is A2-bit HARQ-ACK, wherein A1 is equal or unequal to A2, and A1+A2 does not exceed the first preset threshold; or
   the first UCI is A3-bit HARQ-ACK, and the second UCI is an SR, and A3 does not exceed the first preset threshold; or
   in Method II, the first UCI is A4-bit HARQ-ACK and the second UCI is A5-bit HARQ-ACK, wherein A4 is equal or unequal to A5, and at least one of A4 and A5 does not exceed the first preset threshold; or
   the first UCI is A6-bit HARQ-ACK and the second UCI is an SR, wherein at least one of a bit number of the SR and A6 does not exceed the first preset threshold, the bit number of the SR is X=ceil(log2(K+1)), ceil( ) is rounding up, K is a configured number of SRs or a number of SRs meeting the following condition:
   the second uplink channel carrying the SR overlaps in a time domain with the first uplink channel, or a transmission time interval between the first uplink channel and the second uplink channel carrying the SR is less than the second preset threshold.

4. The method according to claim 3, in Method I, when the first UCI is A1-bit HARQ-ACK and the second UCI is A2-bit HARQ-ACK, further comprising:
   if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, adopting one of the following methods:
   Method 1: determining that the SR has a bit number of X bits, cascading the X-bit SR with the first UCI and the second UCI to obtain a second cascaded UCI sequence, and encoding the second cascaded UCI sequence in the second-type encoding scheme;

Method 2: determining that the SR has a bit number of X bits, cascading the X-bit SR with the first UCI and the second UCI to obtain a second cascaded UCI sequence, and when determining that a total number of bits of the second cascaded UCI sequence does not exceed the first preset threshold, encoding the second cascaded UCI sequence in the first-type encoding scheme, or, adding a padding bit or an occupancy bit to the second cascaded UCI sequence till satisfying that a total number of bits of the second cascaded UCI sequence exceeds the first preset threshold, obtaining a padded second cascaded UCI sequence, and encoding the padded second cascaded UCI sequence in the second-type encoding scheme; and when determining that the total number of bits of the second cascaded UCI sequence exceeds the first preset threshold, encoding the second cascaded UCI sequence in the second-type encoding scheme;

wherein X=ceil(log2(K+1)), ceil( ) is rounding up, and K is a configured number of SRs or a number of SRs meeting the following condition:

the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold; or when the first UCI is A3-bit HARQ-ACK and the second UCI is an SR, further comprising:

Method 1: determining that the SR has a bit number of X bits, cascading the X-bit SR with the first UCI to obtain a third cascaded UCI sequence, and encoding the third cascaded UCI sequence in the second-type encoding scheme; or, Method 2: determining that the SR has a bit number of X bits, cascading the X-bit SR with the first UCI to obtain a third cascaded UCI sequence, and when determining that a total number of bits of the third cascaded UCI sequence does not exceed the first preset threshold, encoding the third cascaded UCI sequence in the first-type encoding scheme, or, adding a padding bit or an occupancy bit to the third cascaded UCI sequence till satisfying that a total number of bits of the third cascaded UCI sequence exceeds the first preset threshold, obtaining a padded third cascaded UCI sequence, and encoding the padded third cascaded UCI sequence in the second-type encoding scheme; and when determining that the total number of bits of the third cascaded UCI sequence exceeds a predetermined threshold, encoding the third cascaded UCI sequence in the second-type encoding scheme, wherein X=ceil(log2(K+1)), ceil( ) is rounding up, and K is a configured number of SRs or a number of SRs meeting the following condition:

the second uplink channel carrying the SR overlaps in a time domain with the first uplink channel, or a transmission time interval between the first uplink channel and the second uplink channel carrying the SR is less than the second preset threshold; or in Method II, when the first UCI is A4-bit HARQ-ACK and the second UCI is A5-bit HARQ-ACK, if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, further comprising:

determining that the SR has a bit number of X bits, and cascading the X-bit SR with first target UCI to obtain a fourth cascaded UCI sequence, wherein the first target UCI is one of the first UCI and the second UCI; encoding respectively, in the first-type decoding scheme, each individual sequence within the fourth cascaded UCI sequence and second target UCI for which a bit number does not exceed the first preset threshold, or, adding respectively a padding bit or an occupancy bit to each individual sequence till satisfying that a total number of bits exceeds the first preset threshold, and encoding, in the second-type encoding scheme, the sequence to which the padding bit or the occupancy bit is added; and encoding, in the second-type encoding scheme, each individual sequence within the fourth cascaded UCI sequence and the second target UCI for which a bit number exceeds the first preset threshold, wherein the second target UCI is UCI other than the first target UCI of the first UCI and the second UCI.

5. The method according to claim 1, wherein the transmitting the encoded first UCI sequence and the encoded second UCI sequence on the same uplink channel comprises:

when a padding bit or an occupancy bit is added, determining, according to a bit number of a sequence to which the padding bit or the occupancy bit is added, a PUCCH resource carrying the encoded first UCI sequence and the encoded second UCI sequence; and/or wherein the first-type encoding scheme is repetition encoding or RM encoding, and the second-type encoding scheme is RM encoding, Polar encoding, low-density parity check (LDPC) encoding, tail biting convolutional coding (TBCC) encoding or Turbo encoding; and/or wherein the first UCI and the second UCI are UCI of a same physical layer priority or different physical layer priorities; or the first UCI and the second UCI are respectively one piece of UCI between UCI corresponding to a unicast service and UCI corresponding to a multicast service.

6. An uplink control information (UCI) transmission method, comprising:

receiving, by a network device, an encoded first UCI sequence and an encoded second UCI sequence on a same uplink channel;

determining whether a bit number of a UCI sequence exceeds a first preset threshold, wherein the UCI sequence comprises first UCI and second UCI, and a first uplink channel carrying the first UCI and a second uplink channel carrying the second UCI overlap in a time domain or a transmission time interval between the first uplink channel carrying the first UCI and the second uplink channel carrying the second UCI is less than a second preset threshold;

when determining that the bit number of the UCI sequence does not exceed the first preset threshold, decoding the UCI sequence in a first-type decoding scheme, or, determining that a padding bit or an occupancy bit is added to the UCI sequence by a terminal device till satisfying that a total number of bits exceeds the first preset threshold, and decoding, in a second-type decoding scheme, the sequence to which the padding bit or the occupancy bit is added.

7. The method according to claim 6, further comprising:
Method I: determining, by the network device, that the terminal device cascades the first UCI and the second UCI to obtain a first cascaded UCI sequence;
when determining that a total number of bits of the first cascaded UCI sequence does not exceed the first preset threshold,
decoding the first cascaded UCI sequence in the first-type decoding scheme, or,
determining that a padding bit or an occupancy bit is added to the first cascaded UCI sequence by the terminal device till satisfying that the total number of bits of the first cascaded UCI sequence exceeds the first preset threshold, obtaining a padded first cascaded UCI sequence, and decoding, in the second-type decoding scheme, the sequence to which the padding bit or the occupancy bit is added; or
Method II: determining, by the network device, whether a bit number of the first UCI and a bit number of the second UCI respectively exceeds the first preset threshold;
when determining that the bit number of the first UCI does not exceed the first preset threshold, decoding, by the network device, the first UCI in the first-type decoding scheme, or, determining that a padding bit or an occupancy bit is added to the first UCI by the terminal device till satisfying that the bit number of the first UCI exceeds the first preset threshold, and decoding the padded first UCI sequence in the second-type decoding scheme when a padded first UCI sequence is obtained; and/or,
when determining that the bit number of the second UCI does not exceed the first preset threshold, decoding the second UCI in the first-type decoding scheme, or, determining that a padding bit or an occupancy bit is added to the second UCI by the terminal device till satisfying that the bit number of the second UCI exceeds the first preset threshold, obtaining a padded second UCI sequence, and decoding the padded second UCI sequence in the second-type decoding scheme.

8. The method according to claim 7, wherein in Method I, the first UCI is A1-bit HARQ-ACK and the second UCI is A2-bit HARQ-ACK, wherein A1 is equal or unequal to A2, and A1+A2 does not exceed the first preset threshold; or
the first UCI is A3-bit HARQ-ACK, and the second UCI is an SR, and A3 does not exceed the first preset threshold; or
in Method II, the first UCI is A4-bit HARQ-ACK and the second UCI is A5-bit HARQ-ACK, wherein A4 is equal or unequal to A5, and at least one of A4 and A5 does not exceed the first preset threshold; or
the first UCI is A6-bit HARQ-ACK and the second UCI is an SR, wherein at least one of a bit number of the SR and A6 does not exceed the first preset threshold, the bit number of the SR is X=ceil(log2(K+1)), ceil( ) is rounding up, K is a configured number of SRs or a number of SRs meeting the following condition:
the second uplink channel carrying the SR overlaps in a time domain with the first uplink channel, or a transmission time interval between the first uplink channel and the second uplink channel carrying the SR is less than the second preset threshold.

9. The method according to claim 8, in Method I, when the first UCI is A1-bit HARQ-ACK and the second UCI is A2-bit HARQ-ACK, further comprising:
if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, adopting one of the following methods:
Method 1: determining that the terminal device cascades an X-bit SR with the first UCI and the second UCI to obtain a second cascaded UCI sequence, and decoding the second cascaded UCI sequence in the second-type decoding scheme;
Method 2: determining that the terminal device cascades an X-bit SR with the first UCI and the second UCI to obtain a second cascaded UCI sequence, and when determining that a total number of bits of the second cascaded UCI sequence does not exceed the first preset threshold, decoding the second cascaded UCI sequence in the first-type decoding scheme, or, determining that a padding bit or an occupancy bit is added to the second cascaded UCI sequence by the terminal device till satisfying that a total number of bits of the second cascaded UCI sequence exceeds the first preset threshold, obtaining a padded second cascaded UCI sequence, and decoding the padded second cascaded UCI sequence in the second-type decoding scheme;
and when determining that the total number of bits of the second cascaded UCI sequence exceeds the first preset threshold, decoding the second cascaded UCI sequence in the second-type decoding scheme;
wherein X=ceil(log2(K+1)), ceil( ) is rounding up, and K is a configured number of SRs or a number of SRs meeting the following condition:
the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold; or
when the first UCI is A3-bit HARQ-ACK and the second UCI is an SR, further comprising:
Method 1: determining that the terminal device cascades an X-bit SR with the first UCI to obtain a third cascaded UCI sequence, and decoding the third cascaded UCI sequence in the second-type decoding scheme; or
Method 2: determining that the terminal device cascades an X-bit SR with the first UCI to obtain a third cascaded UCI sequence, and when determining that a total number of bits of the third cascaded UCI sequence does not exceed the first preset threshold, decoding the third cascaded UCI sequence in the first-type decoding scheme, or, determining that a padding bit or an occupancy bit is added to the third cascaded UCI sequence by the terminal device till satisfying that a total number of bits of the third cascaded UCI sequence exceeds the first preset threshold, obtaining a padded third cascaded UCI sequence, and decoding the padded third cascaded UCI sequence in the second-type decoding scheme; and
when determining that the total number of bits of the third cascaded UCI sequence exceeds a predetermined threshold, decoding the third cascaded UCI sequence in the second-type decoding scheme;
wherein X=ceil(log2(K+1)), ceil( ) is rounding up, and K is a configured number of SRs or a number of SRs meeting the following condition:
the second uplink channel carrying the SR overlaps in a time domain with the first uplink channel, or a transmission time interval between the first uplink channel and the second uplink channel carrying the SR is less than the second preset threshold; or in Method II, when the first UCI is A4-bit HARQ-ACK and the second UCI is A5-bit HARQ-ACK, if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, further comprising:

determining that the terminal device cascades an X-bit SR and first target UCI to obtain a fourth cascaded UCI sequence, wherein the first target UCI is one of the first UCI and the second UCI; decoding respectively, by the network device, in the first-type decoding scheme, each individual sequence within the fourth cascaded UCI sequence and second target UCI for which a bit number does not exceed the first preset threshold, or, determining that a padding bit or an occupancy bit is added to each individual sequence by the terminal device till satisfying that a total number of bits exceeds the first preset threshold, and decoding, in the second-type decoding scheme, the sequence to which the padding bit or the occupancy bit is added; and decoding, by the network device in the second-type decoding scheme, each individual sequence within the fourth cascaded UCI sequence and the second target UCI for which a bit number exceeds the first preset threshold; wherein the second target UCI is UCI other than the first target UCI of the first UCI and the second UCI.

10. The method according to claim 6, wherein the receiving, by the network device, the decoded first UCI sequence and the decoded second UCI sequence on the same uplink channel comprises:

when determining that a padding bit or an occupancy bit is added to a UCI sequence by the terminal device, determining, by the network device according to a bit number of the sequence to which the padding bit or the occupancy bit is added, a PUCCH resource for receiving the encoded first UCI sequence and the encoded second UCI sequence; and/or wherein the first-type decoding scheme is repetition decoding or RM decoding, and the second-type decoding scheme is RM decoding, Polar decoding, low-density parity check (LDPC) decoding, tail biting convolutional coding (TBCC) decoding or Turbo decoding; and/or wherein the first UCI and the second UCI are UCI of a same physical layer priority or different physical layer priorities; or the first UCI and the second UCI are respectively one piece of UCI between UCI corresponding to a unicast service and UCI corresponding to a multicast service.

11. An uplink control information (UCI) transmission apparatus, comprising: a memory, a transceiver, and a processor;

wherein the memory is configured to store a computer program; the transceiver is configured to transmit and/or receive data under control of the processor; and the processor is configured to read the computer program in the memory to perform the following:

determining whether a bit number of a UCI sequence exceeds a first preset threshold, wherein the UCI sequence comprises first UCI and second UCI, and a first uplink channel carrying the first UCI and a second uplink channel carrying the second UCI overlap in a time domain or a transmission time interval between the first uplink channel carrying the first UCI and the second uplink channel carrying the second UCI is less than a second preset threshold;

when determining that the bit number of the UCI sequence does not exceed the first preset threshold, encoding the UCI sequence in a first-type encoding scheme, or, adding a padding bit or an occupancy bit to the UCI sequence till satisfying that a total number of bits exceeds the first preset threshold, obtaining a padded UCI sequence, and encoding the padded UCI sequence in a second-type encoding scheme;

transmitting, through the transceiver, an encoded first UCI sequence and an encoded second UCI sequence on a same uplink channel.

12. The apparatus according to claim 11, wherein the processor is further configured to perform the following:

Method I: cascading the first UCI and the second UCI to obtain a first cascaded UCI sequence;

when determining that a total number of bits of the first cascaded UCI sequence does not exceed the first preset threshold, encoding the first cascaded UCI sequence in the first-type encoding scheme, or, adding a padding bit or an occupancy bit to the first cascaded UCI sequence till satisfying that the total number of bits of the first cascaded UCI sequence exceeds the first preset threshold, obtaining a padded first cascaded UCI sequence, and encoding the padded first cascaded UCI sequence in the second-type encoding scheme; or Method II: determining whether a bit number of the first UCI and a bit number of the second UCI respectively exceeds the first preset threshold;

when determining that the bit number of the first UCI does not exceed the first preset threshold, encoding the first UCI in the first-type encoding scheme, or, adding a padding bit or an occupancy bit to the first UCI till satisfying that the bit number of the first UCI exceeds the first preset threshold, obtaining a padded first UCI sequence, and encoding the padded first UCI sequence in the second-type encoding scheme; and/or, when determining that the bit number of the second UCI does not exceed the first preset threshold, encoding the second UCI in the first-type encoding scheme, or, adding a padding bit or an occupancy bit to the second UCI till satisfying that the bit number of the second UCI exceeds the first preset threshold, obtaining a padded second UCI sequence, and encoding the padded second UCI sequence in the second-type encoding scheme.

13. The apparatus according to claim 12, wherein in Method I, the first UCI is A1-bit HARQ-ACK and the second UCI is A2-bit HARQ-ACK, wherein A1 is equal or unequal to A2, and A1+A2 does not exceed the first preset threshold; or the first UCI is A3-bit HARQ-ACK, and the second UCI is an SR, and A3 does not exceed the first preset threshold; or in Method II, the first UCI is A4-bit HARQ-ACK and the second UCI is A5-bit HARQ-ACK, wherein A4 is equal or unequal to A5, and at least one of A4 and A5 does not exceed the first preset threshold, or the first UCI is A6-bit HARQ-ACK and the second UCI is an SR, wherein at least one of a bit number of the SR and A6 does not exceed the first preset threshold, the bit number of the SR is X=ceil(log2(K+1)), ceil( ) is rounding up, K is a configured number of SRs or a number of SRs meeting the following condition:
the second uplink channel carrying the SR overlaps in a time domain with the first uplink channel, or a transmission time interval between the first uplink channel and the second uplink channel carrying the SR is less than the second preset threshold.

14. The apparatus according to claim 13, wherein in Method I, when the first UCI is A1-bit HARQ-ACK and the second UCI is A2-bit HARQ-ACK,
if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, the processor is configured to perform one of the following:
Method 1: determining that the SR has a bit number of X bits, cascading the X-bit SR with the first UCI and the second UCI to obtain a second cascaded UCI sequence, and encoding the second cascaded UCI sequence in the second-type encoding scheme;
Method 2: determining that the SR has a bit number of X bits, cascading the X-bit SR with the first UCI and the second UCI to obtain a second cascaded UCI sequence, and when determining that a total number of bits of the second cascaded UCI sequence does not exceed the first preset threshold, encoding the second cascaded UCI sequence in the first-type encoding scheme, or, adding a padding bit or an occupancy bit to the second cascaded UCI sequence till satisfying that a total number of bits of the second cascaded UCI sequence exceeds the first preset threshold, obtaining a padded second cascaded UCI sequence, and encoding the padded second cascaded UCI sequence in the second-type encoding scheme; and when determining that the total number of bits of the second cascaded UCI sequence exceeds the first preset threshold, encoding the second cascaded UCI sequence in the second-type encoding scheme;
wherein X=ceil(log2(K+1)), ceil( ) is rounding up, and K is a configured number of SRs or a number of SRs meeting the following condition:
the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold; or
when the first UCI is A3-bit HARQ-ACK and the second UCI is an SR, the processor is configured to perform the following:
Method 1: determining that the SR has a bit number of X bits, cascading the X-bit SR with the first UCI to obtain a third cascaded UCI sequence, and encoding the third cascaded UCI sequence in the second-type encoding scheme; or,
Method 2: determining that the SR has a bit number of X bits, cascading the X-bit SR with the first UCI to obtain a third cascaded UCI sequence, and when determining that a total number of bits of the third cascaded UCI sequence does not exceed the first preset threshold, encoding the third cascaded UCI sequence in the first-type encoding scheme, or, adding a padding bit or an occupancy bit to the third cascaded UCI sequence till satisfying that a total number of bits of the third cascaded UCI sequence exceeds the first preset threshold, obtaining a padded third cascaded UCI sequence, and encoding the padded third cascaded UCI sequence in the second-type encoding scheme; and when determining that the total number of bits of the third cascaded UCI sequence exceeds a predetermined threshold, encoding the third cascaded UCI sequence in the second-type encoding scheme,
wherein X=ceil(log2(K+1)), ceil( ) is rounding up, and K is a configured number of SRs or a number of SRs meeting the following condition:
the second uplink channel carrying the SR overlaps in a time domain with the first uplink channel, or a transmission time interval between the first uplink channel and the second uplink channel carrying the SR is less than the second preset threshold; or
in Method II, when the first UCI is A4-bit HARQ-ACK and the second UCI is A5-bit HARQ-ACK, if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, the processor is configured to perform the following:
determining that the SR has a bit number of X bits, and cascading the X-bit SR with first target UCI to obtain a fourth cascaded UCI sequence, wherein the first target UCI is one of the first UCI and the second UCI; encoding respectively, in the first-type decoding scheme, each individual sequence within the fourth cascaded UCI sequence and second target UCI for which a bit number does not exceed the first preset threshold, or, adding respectively a padding bit or an occupancy bit to each individual sequence till satisfying that a total number of bits exceeds the first preset threshold, and encoding, in the second-type encoding scheme, the sequence to which the padding bit or the occupancy bit is added; and encoding, in the second-type encoding scheme, each individual sequence within the fourth cascaded UCI sequence and the second target UCI for which a bit number exceeds the first preset threshold,
wherein the second target UCI is UCI other than the first target UCI of the first UCI and the second UCI.

15. The apparatus according to claim 11, wherein the processor is further configured to perform the following:
when a padding bit or an occupancy bit is added, determining, according to a bit number of a sequence to which the padding bit or the occupancy bit is added, a PUCCH resource carrying the encoded first UCI sequence and the encoded second UCI sequence; and/or
wherein the first-type encoding scheme is repetition encoding or RM encoding, and the second-type encoding scheme is RM encoding, Polar encoding, low-density parity check (LDPC) encoding, tail biting convolutional coding (TBCC) encoding or Turbo encoding; and/or
wherein the first UCI and the second UCI are UCI of a same physical layer priority or different physical layer priorities; or the first UCI and the second UCI are respectively one piece of UCI between UCI corresponding to a unicast service and UCI corresponding to a multicast service.

16. An uplink control information (UCI) transmission apparatus, comprising:
a memory, a transceiver, and a processor;
wherein the memory is configured to store a computer program; the transceiver is configured to transmit and/or receive data under control of the processor; and the processor is configured to read the computer program in the memory to perform the method according to claim 6.

17. The apparatus according to claim 16, wherein the processor is further configured to perform the following:
Method I: determining that the terminal device cascades the first UCI and the second UCI to obtain a first cascaded UCI sequence;
when determining that a total number of bits of the first cascaded UCI sequence does not exceed the first preset threshold,
decoding the first cascaded UCI sequence in the first-type decoding scheme, or,
determining that a padding bit or an occupancy bit is added to the first cascaded UCI sequence by the terminal device till satisfying that the total number of bits of the first cascaded UCI sequence exceeds the first preset threshold, obtaining a padded first cascaded UCI sequence, and decoding, in the second-type decoding scheme, the sequence to which the padding bit or the occupancy bit is added; or
Method II: determining whether a bit number of the first UCI and a bit number of the second UCI respectively exceeds the first preset threshold;
when determining that the bit number of the first UCI does not exceed the first preset threshold, decoding the first UCI in the first-type decoding scheme, or, determining that a padding bit or an occupancy bit is added to the first UCI by the terminal device till satisfying that the bit number of the first UCI exceeds the first preset threshold, and decoding the padded first UCI sequence in the second-type decoding scheme when a padded first UCI sequence is obtained; and/or,
when determining that the bit number of the second UCI does not exceed the first preset threshold, decoding the second UCI in the first-type decoding scheme, or, determining that a padding bit or an occupancy bit is added to the second UCI by the terminal device till satisfying that the bit number of the second UCI exceeds the first preset threshold, obtaining a padded second UCI sequence, and decoding the padded second UCI sequence in the second-type decoding scheme.

18. The apparatus according to claim 17, wherein in Method I, the first UCI is A1-bit HARQ-ACK and the second UCI is A2-bit HARQ-ACK, wherein A1 is equal or unequal to A2, and A1+A2 does not exceed the first preset threshold; or
the first UCI is A3-bit HARQ-ACK, and the second UCI is an SR, and A3 does not exceed the first preset threshold; or
in Method II, the first UCI is A4-bit HARQ-ACK and the second UCI is A5-bit HARQ-ACK, wherein A4 is equal or unequal to A5, and at least one of A4 and A5 does not exceed the first preset threshold; or
the first UCI is A6-bit HARQ-ACK and the second UCI is an SR, wherein at least one of a bit number of the SR and A6 does not exceed the first preset threshold, the bit number of the SR is $X=\mathrm{ceil}(\log 2(K+1))$, ceil( ) is rounding up, K is a configured number of SRs or a number of SRs meeting the following condition:
the second uplink channel carrying the SR overlaps in a time domain with the first uplink channel, or a transmission time interval between the first uplink channel and the second uplink channel carrying the SR is less than the second preset threshold.

19. The apparatus according to claim 18, wherein in Method I, when the first UCI is A1-bit HARQ-ACK and the second UCI is A2-bit HARQ-ACK,
if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, the processor is further configured to one of the following:
Method 1: determining that the terminal device cascades an X-bit SR with the first UCI and the second UCI to obtain a second cascaded UCI sequence, and decoding the second cascaded UCI sequence in the second-type decoding scheme;
Method 2: determining that the terminal device cascades an X-bit SR with the first UCI and the second UCI to obtain a second cascaded UCI sequence, and when determining that a total number of bits of the second cascaded UCI sequence does not exceed the first preset threshold, decoding the second cascaded UCI sequence in the first-type decoding scheme, or, determining that a padding bit or an occupancy bit is added to the second cascaded UCI sequence by the terminal device till satisfying that a total number of bits of the second cascaded UCI sequence exceeds the first preset threshold, obtaining a padded second cascaded UCI sequence, and decoding the padded second cascaded UCI sequence in the second-type decoding scheme; and when determining that the total number of bits of the second cascaded UCI sequence exceeds the first preset threshold, decoding the second cascaded UCI sequence in the second-type decoding scheme;
wherein $X=\mathrm{ceil}(\log 2(K+1))$, ceil( ) is rounding up, and K is a configured number of SRs or a number of SRs meeting the following condition:
the third uplink channel carrying the SR overlaps in a time domain with the first uplink channel and/or the second uplink channel, or a transmission time interval between the third uplink channel carrying the SR and the first uplink channel and/or the second uplink channel is less than the second preset threshold; or
when the first UCI is A3-bit HARQ-ACK and the second UCI is an SR, the processor is further configured to perform the following:
Method 1: determining that the terminal device cascades an X-bit SR with the first UCI to obtain a third cascaded UCI sequence, and decoding the third cascaded UCI sequence in the second-type decoding scheme; or
Method 2: determining that the terminal device cascades an X-bit SR with the first UCI to obtain a third cascaded UCI sequence, and when determining that a total number of bits of the third cascaded UCI sequence does not exceed the first preset threshold, decoding the third cascaded UCI sequence in the first-type decoding scheme, or, determining that a padding bit or an occupancy bit is added to the third cascaded UCI sequence by the terminal device till satisfying that a total number of bits of the third cascaded UCI sequence exceeds the first preset threshold, obtaining a padded third cascaded UCI sequence, and decoding the padded third cascaded UCI sequence in the second-type decoding scheme; and when determining that the total number of bits of the third cascaded UCI sequence exceeds a predetermined threshold, decoding the third cascaded UCI sequence in the second-type decoding scheme;

wherein X=ceil(log2(K+1)), ceil( ) is rounding up, and K is a configured number of SRs or a number of SRs meeting the following condition:

the second uplink channel carrying the SR overlaps in a time domain with the first uplink channel, or a transmission time interval between the first uplink channel and the second uplink channel carrying the SR is less than the second preset threshold; or wherein in Method II, when the first UCI is A4-bit HARQ-ACK and the second UCI is A5-bit HARQ-ACK, if a third uplink channel carrying an SR overlaps in a time domain with the first uplink channel and/or the second uplink channel, or a transmission time interval between the third uplink channel carrying the SR and the first uplink channel and/or the second uplink channel is less than the second preset threshold, the processor is further configured to perform the following:

determining that the terminal device cascades an X-bit SR and first target UCI to obtain a fourth cascaded UCI sequence, wherein the first target UCI is one of the first UCI and the second UCI; decoding respectively, by the network device, in the first-type decoding scheme, each individual sequence within the fourth cascaded UCI sequence and second target UCI for which a bit number does not exceed the first preset threshold, or, determining that a padding bit or an occupancy bit is added to each individual sequence by the terminal device till satisfying that a total number of bits exceeds the first preset threshold, and decoding, in the second-type decoding scheme, the sequence to which the padding bit or the occupancy bit is added; and decoding, by the network device in the second-type decoding scheme, each individual sequence within the fourth cascaded UCI sequence and the second target UCI for which a bit number exceeds the first preset threshold; wherein the second target UCI is UCI other than the first target UCI of the first UCI and the second UCI.

20. The apparatus according to claim 16, wherein the processor is further configured to perform the following:

when determining that a padding bit or an occupancy bit is added to a UCI sequence by the terminal device, determining, according to a bit number of the sequence to which the padding bit or the occupancy bit is added, a PUCCH resource for receiving the encoded first UCI sequence and the encoded second UCI sequence; and/or wherein the first-type decoding scheme is repetition decoding or RM decoding, and the second-type decoding scheme is RM decoding, Polar decoding, low-density parity check (LDPC) decoding, tail biting convolutional coding (TBCC) decoding or Turbo decoding; and/or wherein the first UCI and the second UCI are UCI of a same physical layer priority or different physical layer priorities; or the first UCI and the second UCI are respectively one piece of UCI between UCI corresponding to a unicast service and UCI corresponding to a multicast service.

* * * * *